United States Patent
Matsushima et al.

(10) Patent No.: US 7,624,199 B2
(45) Date of Patent: Nov. 24, 2009

(54) DIGITAL DATA DISTRIBUTION SYSTEM WITH SWITCHING UNIT, ONLINE ACQUISITION UNIT, AND CONVERSION UNIT FOR CONVERTING FROM FIRST TO SECOND FORMAT

(75) Inventors: Hideki Matsushima, Hirakata (JP); Ryuichi Okamoto, Kadoma (JP); Mitsuhiro Inoue, Osaka (JP); Masayuki Kozuka, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 1004 days.

(21) Appl. No.: 10/169,606

(22) PCT Filed: Nov. 7, 2001

(86) PCT No.: PCT/US01/51574

§ 371 (c)(1),
(2), (4) Date: Oct. 2, 2003

(87) PCT Pub. No.: WO02/099558

PCT Pub. Date: Dec. 12, 2002

(65) Prior Publication Data

US 2005/0033864 A1 Feb. 10, 2005
US 2008/0320173 A9 Dec. 25, 2008

(51) Int. Cl.
*G06F 13/00* (2006.01)
*G10L 11/00* (2006.01)
*G06K 9/36* (2006.01)

(52) U.S. Cl. .......................... 710/5; 709/219; 709/224; 709/231; 709/232; 704/102; 704/104.1; 704/270; 710/1; 710/20; 710/29; 710/33

(58) Field of Classification Search .................... 710/1, 710/5, 20, 29, 33; 709/219, 231, 224, 232; 704/102, 104.1, 270

See application file for complete search history.

(56) References Cited

U.S. PATENT DOCUMENTS

| 5,862,260 A | 1/1999 | Rhoads |
| 5,987,525 A | 11/1999 | Roberts et al. |
| 6,061,680 A | 5/2000 | Scherf et al. |
| 6,154,773 A | 11/2000 | Roberts et al. |
| 6,161,132 A | 12/2000 | Roberts et al. |
| 6,278,807 B1 | 8/2001 | Ito et al. |

(Continued)

FOREIGN PATENT DOCUMENTS

JP 11-283325 10/1999

*Primary Examiner*—Tammara Peyton
(74) *Attorney, Agent, or Firm*—Wenderoth, Lind & Ponack, L.L.P.

(57) ABSTRACT

A CD on which only music information specified by the CD-DA is recorded, or a CD on which both music information specified by the CD-DA and music information to be recorded on a CD-ROM are recorded is mounted upon an information processing terminal. When the CD on which only music information specified by the CD-DA is recorded is mounted, the information processing terminal acquires, from a directory server, an ISRC number that identifies the music information recorded on the CD, and distribution server location information that identifies a content distribution server. The information processing terminal acquires content that is the music information compressed according to the MP3 and encrypted, from the content distribution server identified by the acquired distribution server location information, and the decryption key. The information processing terminal then decrypts the acquired content using the acquired decryption key and reproduces music.

8 Claims, 23 Drawing Sheets

U.S. PATENT DOCUMENTS 6,314,518 B1 11/2001 Linnartz
6,505,160 B1 * 1/2003 Levy et al. .................. 704/270
6,957,220 B2 * 10/2005 Lamkin et al. .............. 707/100

* cited by examiner

CONTENT

| ISRC NUMBER | | KEY DISTRIBUTION SERVER NAME | CONTENT DISTRIBUTION SERVER NAME | ADDITIONAL-INFORMATION DISTRIBUTION SERVER LOCATION INFORMATION | ADDITIONAL-INFORMATION DISTRIBUTION SERVER DESCRIPTION |
|---|---|---|---|---|---|
| NLC2 38488 700 | SONG DATA | http://www.Key-*.com | DISTRIBUTION SERVER A | http://www.karaoke-*.com | KARAOKE SITE |
| | | | | http://www.image-***.com | IMAGE DISTRIBUTION SITE |
| | | | | .. | .. |

FIG.6

MEDIA ID REFERENCE TABLE 230

| MEDIA ID | OFFSET | TOTAL TIME PERIOD |
|---|---|---|
| 020f8814 | 150 10050 19130 38090 ··· | 4000 |
| 039ff6e23 | 203 8009 10005 14030 ··· | 3549 |
| 0045ab4c | 402 500 8000 10399 ··· | 2090 |

FIG. 7

DISTRIBUTION SERVER REFERENCE TABLE 240

| MEDIA ID | DISTRIBUTION SERVER LOCATION INFORMATION |
|---|---|
| 020f8814 | http://www.recordA.com |
| 039ff6e23 | http://www.recordB.com |
| 0045ab4c | http://www.recordC.com |

FIG.8

ISRC REFERENCE TABLE 250

| MEDIA ID | SONG NUMBER | ISRC NUMBER |
|---|---|---|
| 020f8814 | 1 | SET388630212 |
| 020f8814 | 2 | SET388630213 |
| 039ff6e23 | 1 | NLB2384488701 |
| 0045ab4c | 1 | NLC2384488700 |

FIG.10

CONTENT STORAGE REFERENCE TABLE 330

| ISRC NUMBER | FILE NAME | DECRYPTION KEY |
|---|---|---|
| SET388630212 | D:¥CD1¥CD1_1.emd | D:¥CD1¥CD1_1.key |
| SET388630213 | D:¥CD1¥CD1_2.emd | D:¥CD1¥CD1_2.key |
| NLB2384488701 | D:¥CD2¥CD1_1.emd | D:¥CD2¥CD1_1.key |
| NLC2384488700 | D:¥CD3¥CD1_2.emd | D:¥CD3¥CD1_2.key |

CUSTOMER INFORMATION MANAGEMENT TABLE

| TERMINAL ID | CUSTOMER INFORMATION (name, address, tel, age.....) |
|---|---|
| AAA12...11 | H.Matsushima, 10989 Bluffside..... |
| BBB56...34 | .. |
| ABC76..90 | .. |

FIG.12

DOWNLOAD CONTENT MANAGEMENT TABLE 350

| TERMINAL ID | [DOWNLOAD CONTENT FILE NAME, DIRECTORY SERVER NAME] |
|---|---|
| AAA12...11 | [D:¥CD1¥CD1_1.emd、D Server1]、[D:¥CD1¥CD1_1.emd..... |
| BBB56...34 | .. |
| ABC76...90 | .. |

FIG.14

ADDITIONAL-INFORMATION
STORAGE REFERENCE TABLE
430

| ISRC NUMBER | FILE NAME |
|---|---|
| SET3886302l2 | D:¥kara1¥kara1_1.aac |
| SET3886302l3 | D:¥kara1¥kara1_2.aac |
| NLB2384888701 | D:¥kara2¥Ckara1_1.aac |
| NLC2384888700 | D:¥kara3¥kara1_2.aac |

FIG.15

CUSTOMER INFORMATION MANAGEMENT TABLE 440

| TERMINAL ID | CUSTOMER INFORMATION (name,address,tel,age.....) |
|---|---|
| AAA12...11 | H.Matsushima,10989 Bluffside..... |
| BBB56...34 | .. |
| ABC76..90 | .. |

FIG.16

DOWNLOAD ADDITIONAL-INFORMATION MANAGEMENT TABLE 450

| TERMINAL ID | [DOWNLOAD CONTENT NAME, CONTENT DISTRIBUTION SERVER NAME] |
|---|---|
| AAA12...11 | [D:¥kara1¥kara1_1.aac, C Server1], [D:¥kara2¥Ckara1_1.aac..... |
| BBB56...34 | .. |
| ABC76..90 | .. |

DIGITAL DATA DISTRIBUTION SYSTEM WITH SWITCHING UNIT, ONLINE ACQUISITION UNIT, AND CONVERSION UNIT FOR CONVERTING FROM FIRST TO SECOND FORMAT

This application is a U.S. national stage application of International application No. PCT/US01/51574 filed Nov. 7, 2001, which claims priority to U.S. application Ser. No. 09/706,755, filed Nov. 7, 2000.

TECHNICAL FIELD

The present invention relates to a digital data distribution technique for distributing digital data via a network.

BACKGROUND ART

In recent years, so-called electronic music distribution (hereafter simply, "EMD")—downloading digital music information available to the public on the Internet to a personal computer (hereafter simply, a "PC") and reproducing the music information by a computer program in the PC—has attracted much attention.

In relation to this, techniques for delivering entertainment content complementary to a musical recording to a user's computer by means of a computer network link are disclosed in U.S. Pat. No. 5,987,525, U.S. Pat. No. 6,061,680, U.S. Pat. No. 6,154,773, and U.S. Pat. No. 6,161,132.

With the advent of the MP3 (MPEG audio layer-3) that is a CODEC enabling high-compression of digital music information while maintaining high-audio quality, users can easily compress and record, on their PCs, music information that is recorded on their music CDs in the Compact Disc Digital Audio (hereafter simply, "CD-DA") format, using ripping software compliant with the MP3. The users can also store the music information in the hard disk unit of their PCs. Here, the ripping software is a computer program to convert music information recorded on music CDs into music information suitable for being handled on PCs. Furthermore, now that portable devices (hereafter simply, "PDs") for reproducing music information compressed by the MP3, such as "RIO" manufactured by Diamond Multimedia Systems, Inc. have appeared, the users can write music information compressed by the MP3 into their PCs using a program for PCs, and play back music outside by taking the PCs there.

The MP3 has been widely accepted by the users and won enormous popularity for its convenience.

However, the high-compression feature of the MP3 suitable for data exchange on the Internet has created an increasing number of Websites publishing unauthorized data generated by the MP3 without permission of copyright holders of the data.

Predicting that CD sales will drop and the entire music industry will be on the decline in such a situation, the recording industry has established the SDMI (Secure Digital Music Initiative), a group defining a framework for distributing copyrighted music data on the Internet.

In such an effort, the following specific techniques are being employed. One technique is for embedding a digital watermark into music information to indicate that the music information is copyrighted content or not. Another technique is for encrypting compressed and recorded music information to prevent unauthorized copy from being made.

TECHNICAL PROBLEM

However, the problem is that detecting a digital watermark while converting music information recorded on a CD into music information suitable for a CODEC such as the MP3 and the AAC (Advanced Audio Coding) degrades the conversion efficiency. The conversion efficiency is further degraded when encrypted music information is decrypted.

DISCLOSURE OF THE INVENTION

In view of the above problem, the object of the present invention is to provide a digital data distribution system, an information processing device, a directory distribution device, a content distribution device, and an additional-information distribution device, which enable efficient conversion of digital-work information recorded on music CDs into digital-work information suitable for a CODEC, and to provide a method and a program for enabling distributions for the same, and a recording medium on which the program is recorded.

The above object of the present invention can be achieved by an information processing device that accesses a recording medium on which (a) information unique to the recording medium and (b) first information expressing a work in a first format are recorded, to acquire second information expressing the work in a second format, including: a selection unit operable to select one of (1) conversion of the first information into the second information, and (2) online-acquisition of the second information from a content distribution device connected to the information processing device via a distribution network; a first read unit operable to read the first information from the recording medium, when the conversion is selected; a conversion unit operable to convert the read first information from the first format to the second format, to acquire the second information; a second read unit operable to read the unique information from the recording medium, when the online-acquisition is selected; and an online-acquisition unit operable to acquire the second information interrelated with the read unique information, from the content distribution device that stores the second information and the unique information in an interrelated manner.

With this construction, the selected operation determines whether the first information is converted into the second information, or the second information is acquired from the content distribution device connected via the distribution network. Therefore, the second information can be acquired efficiently.

Here, the online-acquisition unit may include: first acquisition unit operable to acquire, based on the read unique information, ID information identifying the second information and location information indicating a location at which the content distribution device is connected on the distribution network, from a directory distribution device connected on the distribution network; and a second acquisition unit operable to acquire the second information identified by the acquired ID information, from the content distribution device whose location is indicated by the acquired location information.

With this construction, the location information that indicates a location at which the content distribution device is connected can be acquired from the directory distribution device, and the second information can be acquired from the content distribution device indicated by the location information. Therefore, the information processing device simply provided with the location information of the directory distribution device ensures acquisition of the second information via the distribution network.

Also, the present invention relates to a directory distribution device, including: a storage unit operable to store, in an interrelated manner, (a) unique information that is unique to a recording medium on which first information expressing a work in a first format is recorded, (b) ID information that identifies second information expressing the work in a second format, and (c) location information that indicates a location at which a content distribution device is connected on a distribution network; a reception unit operable to receive the unique information from an information processing device via the distribution network; an extraction unit operable to extract the ID information and the location information that are interrelated with the received unique information, from the storage unit; and a transmission unit operable to transmit the extracted ID information and the extracted location information to the information processing device.

With this construction, the directory distribution device transmits the location information that indicates a location at which the content distribution device is connected, to the information processing device. Therefore, the information processing device simply provided with the location information of the directory distribution device ensures acquisition of the second information via the distribution network.

Also, the present invention relates to a content distribution device that accesses a recording medium on which (a) information unique to the recording medium and (b) first information expressing a work in a first format are recorded, so as to transmit second information expressing the work in a second format to an information processing device that acquires the second information, the content distribution device including: a storage unit operable to store the second information and ID information identifying the second information in an interrelated manner; a reception unit operable to receive the ID information identifying the second information from the information processing device via a distribution network; an extraction unit operable to extract the second information identified by the received ID information from the storage unit; and a transmission unit operable to transmit the extracted second information to the information processing device.

With this construction, the content distribution device ensures transmission of the second information to the information processing device via the distribution network.

Also, the present invention relates to an additional-information distribution device that accesses a recording medium on which (a) information unique to the recording medium and (b) first information expressing a work in a first format are recorded, so as to transmit additional information relating to second information expressing the work in a second format, to an information processing device that has acquired the second information, the additional-information distribution device including: a storage unit operable to store the additional information and ID information identifying the second information in an interrelated manner; a reception unit operable to receive the ID information identifying the second information from the information processing device via a distribution network; an extraction unit operable to extract the additional information identified using the received ID information from the storage unit; and a transmission unit operable to transmit the extracted additional information to the information processing device.

With this construction, the additional-information distribution device ensures transmission of additional information relating to the second information, to the information processing device via the distribution network.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 is a data structure diagram showing information recorded in a CD-ROM region of a CD;

FIG. 6 is a data structure diagram showing the construction of a media ID reference table 230;

FIG. 7 is a data structure diagram showing the construction of a distribution server reference table 240;

FIG. 8 is a data structure diagram showing the construction of an ISRC reference table 250;

FIG. 10 is a data structure diagram showing the construction of a content storage reference table 330;

FIG. 11 is a data structure diagram showing the construction of a customer information management table 340;

FIG. 12 is a data structure diagram showing the construction of a download content management table 350;

FIG. 14 is a data structure diagram showing the construction of an additional-information storage reference table 430;

FIG. 15 is a data structure diagram showing the construction of a customer information management table 440;

FIG. 16 is a data structure diagram showing the construction of a download additional-information management table 450;

BEST MODE FOR CARRYING OUT THE INVENTION

As a first embodiment of the present invention, the following describes a digital data distribution system 1.

1. Construction of the Digital Data Distribution System 1

Figure 1:
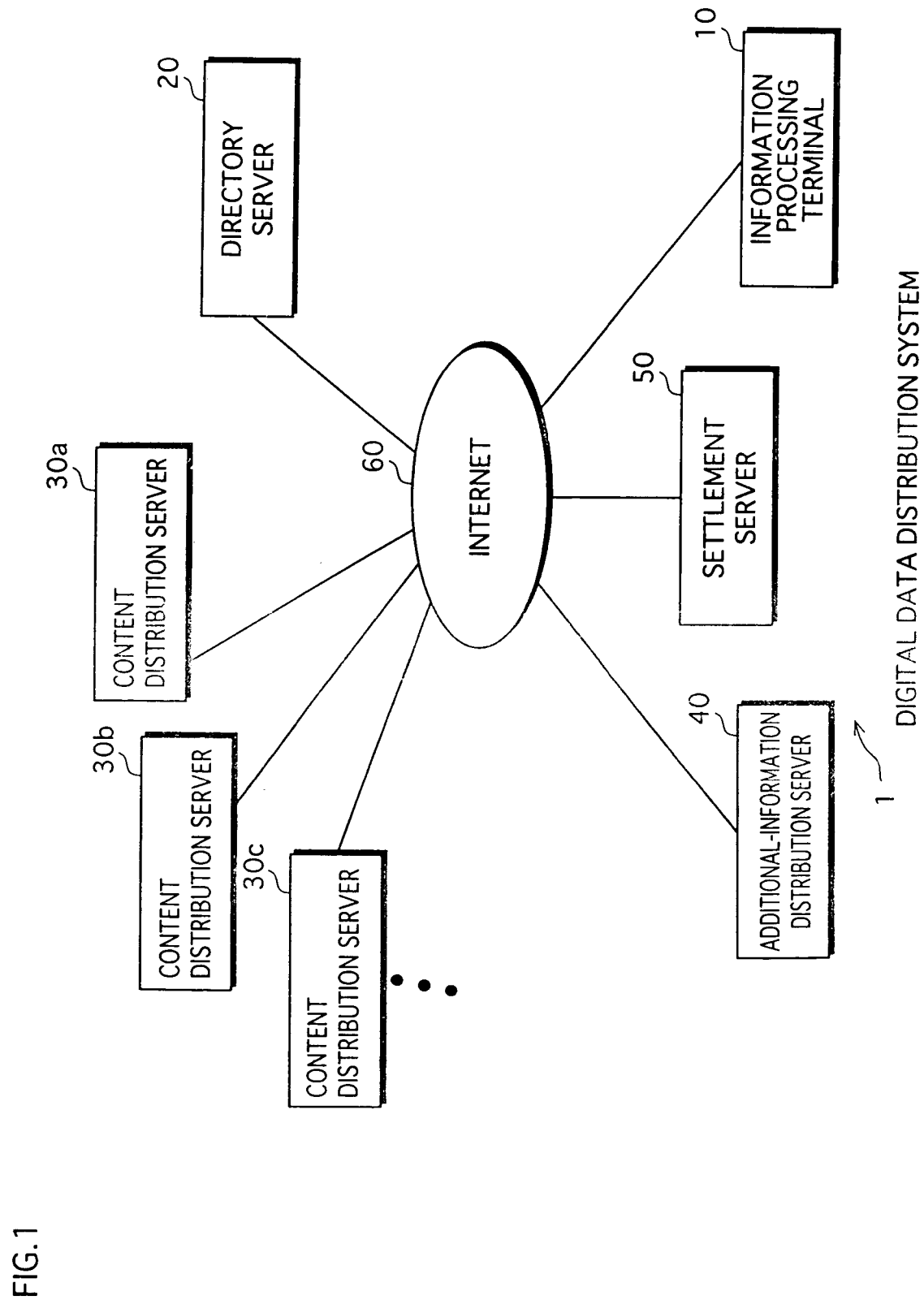
FIG. 1 is a block diagram showing a digital data distribution system 1.

As FIG. 1 shows, the digital data distribution system 1 includes an information processing terminal 10, a directory server 20, a content distribution server 30a, a content distribution server 30b, a content distribution server 30c, . . . , an additional-information distribution server 40, and a settlement server 50. These devices are connected with one another via the Internet 60.

A CD on which only music information specified by the CD-DA is recorded, or a CD on which not only music information specified by the CD-DA but also music information to be recorded on a CD-ROM are recorded, is mounted upon the information processing terminal 10.

When the CD on which only music information specified by the CD-DA is recorded is mounted, the information processing terminal 10 acquires an ISRC number indicating a piece of music information recorded on the CD and distribution server location information identifying one of the content distribution servers 30a, 30b, 30c, . . . from the directory server 20. Next, the information processing terminal 10 acquires (a) content that is the piece of music information compressed according to the MP3 and encrypted, and (b) its decryption key, from the one of the content distribution servers 30a, 30b, 30c, . . . identified by the acquired distribution server location information. Next, the information processing terminal 10 decrypts the acquired content using the acquired decryption key, and reproduces music.

When the CD on which not only music information specified by the CD-DA but also encrypted music information to be recorded on a CD-ROM are recorded is mounted, the information processing terminal 10 acquires a decryption key from the content distribution server, decrypts content recorded on the CD using the acquired decryption key, and reproduces music.

1.1 Information Processing Terminal 10

Figure 2:
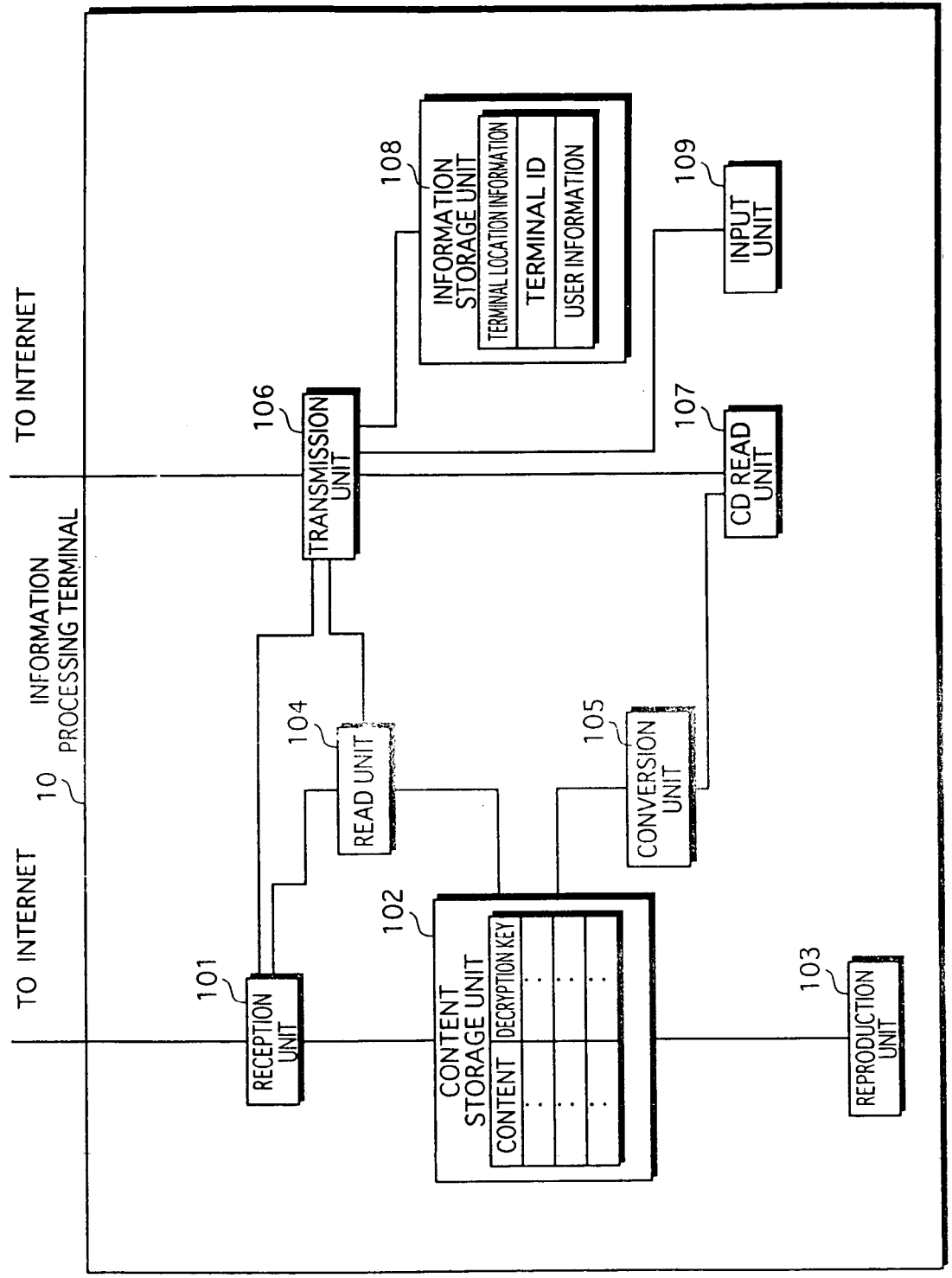
FIG. 2 is a block diagram showing the construction of an information processing terminal 10.

As FIG. 2 shows, the information processing terminal 10 includes a reception unit 101, a content storage unit 102, a reproduction unit 103, a read unit 104, a conversion unit 105, a transmission unit 106, a CD read unit 107, an information storage unit 108, and an input unit 109.

The information processing terminal 10 is specifically a personal computer system made up of a microprocessor, a ROM, a RAM, a hard disk unit, a display unit, a keyboard, a mouse, a LAN connection unit, a CD input-output unit, and the like. The RAM or the hard disk unit stores a computer program. The functions of the information processing terminal 10 are realized by the microprocessor operating according to the computer program.

(1) Information Storage Unit 108

The information storage unit 108 is specifically constructed by a hard disk unit, and prestores terminal location information, a terminal ID, and user information.

The terminal location information is identification information that identifies a location at which the information processing terminal 10 is connected on the Internet 60. To be more specific, the terminal location information is an IP address.

The terminal ID is an identifier for identifying the information processing terminal 10.

The user information includes information relating to a user of the information processing terminal 10. To be more specific, the user information includes a name, an address, and a telephone number of the user.

(2) CD Structure

The following describes the structure of a plurality of types of CDs that can be mounted upon the information processing terminal 10, and the structure of information recorded on these CDs. These CDs are realized by CD EXTRAs that can store data reproducible on a personal computer as well as data normally recorded on music CDs. It should be noted that these CDs may instead be realized by other recording media such as a DVD, a PD, a FD, and a semiconductor medium.

The CDs that are mounted upon the information processing terminal 10 are roughly categorized into two types, one having a CD-DA region for storing information specified by the CD-DA, and the other having both a CD-ROM region for storing information that is to be recorded on a CD-ROM and the CD-DA region.

Figure 3:
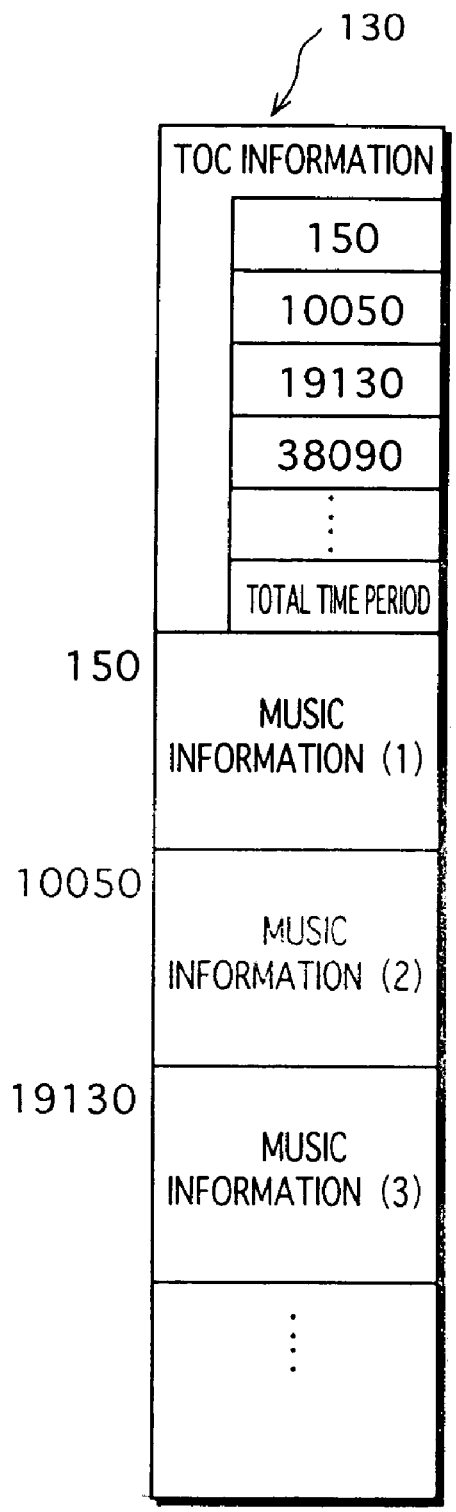
FIG. 3 is a data structure diagram showing the construction of information recorded in a CD-DA region of a CD.

As FIG. 3 shows, TOC (Table of Contents) information specified by the CD-DA and at least one piece of music information are recorded in the CD-DA region. The TOC information includes at least one logical sector address and a total time period. The logical sector address identifies the start point of a region in which the piece of music information is recorded. The total time period is a time period taken to reproduce all pieces of music information recorded in the CD-DA region.

As FIG. 4 shows, content is recorded in the CD-ROM region. The content includes at least one information-set consisting of an ISRC number, song data, a key distribution server name, a content distribution server name, additional-information distribution server location information, and additional-information distribution server description, which are interrelated.

The ISRC number is determined by the ISRC (International Standard Recording Code—an international specification standardized by the ISO (International Organization for Standardization)), and is the only identification information for identifying music in the world. The ISRC number is made up of a country code, a company code, a recording year, and a recording number. Note that although the ISRC number is used to identify the content in the present embodiment, any number that can identify and manage the content can be used.

The song data is data acquired by compressing music information according to the MP3 and encrypting the compressed music information. The encryption method employed here is generally a secret key encryption method for performing encryption and decryption using the same key. It should be noted that a public key encryption method for performing encrypting and decryption using a different key may instead be employed.

The key distribution server name is an identification name for identifying a server that stores a decryption key for decrypting the song data and provides the decryption key via the Internet 60. In the present embodiment, this server is realized by the content distribution servers 30a, 30b, 30c, . . . .

The content distribution server name is an identification name for identifying a server that distributes the content via the Internet 60. In the present embodiment, this server is realized by the content distribution servers 30a, 30b, 30c, . . . .

The additional-information distribution server location information is an identification name for identifying a server that distributes additional information via the Internet 60. In the present embodiment, this server is realized by the additional-information distribution server 40. Here, the additional information is information relating to the content, and, for example, may be a still image or a moving image relating to song data included in the content, or may be character information indicating lyrics of song data included in the content.

The additional-information distribution server description briefly describes a server identified by the additional-information distribution server location information.

(3) Input Unit 109

The input unit 109 specifically includes a keyboard, a mouse, and the like.

The input unit 109 receives an input of a conversion instruction to convert music information recorded in the CD-DA region of a music CD into music information in the format specified by the MP3, or an acquisition instruction to acquire music information that has already been converted in the format specified by the MP3, via the Internet 60.

Upon receipt of the acquisition instruction, the input unit 109 receives, from the user, an input of an acquisition request to acquire ripping content, and outputs the acquisition request to the CD read unit 107 and the transmission unit 106. Also, the input unit 109 receives an input of a song number that identifies the ripping content from the user, and outputs the song number to the transmission unit 106.

Upon receipt of the conversion instruction, the input unit 109 outputs the conversion instruction to the CD read unit 107.

(4) CD Read Unit 107

The CD read unit 107 is specifically constructed by a CD input-output unit and the like.

The CD read unit 107 receives the acquisition request to acquire the ripping content from the input unit 109. Upon receipt of the acquisition request, the CD read unit 107 judges a type of a CD mounted upon the information processing terminal 10. To be more specific, the CD read unit 107 judges whether the CD mounted upon the information processing terminal 10 stores information only in its CD-DA region, or the CD stores information in its CD-DA region and also stores information in its CD-ROM region.

When judging that the CD stores information only in its CD-DA region, the CD read unit 107 reads TOC information from the CD, and outputs the read TOC information to the transmission unit 106.

When judging that the CD stores information in its CD-DA region and also stores information in its CD-ROM region, i.e., that a content 140 is recorded, the CD read unit 107 reads a key distribution server name and an ISRC number from content recorded in the CD-ROM region in the CD, and outputs the read key distribution server name and ISRC number to the transmission unit 106.

Also, the CD read unit 107 receives the conversion instruction from the input unit 109. Upon receipt of this instruction, the CD read unit 107 reads music information recorded in the CD-DA region, and outputs the read music information to the conversion unit 105.

(5) Transmission Unit 106

The transmission unit 106 receives the acquisition request from the input unit 109. Upon receipt of this request, the transmission unit 106 reads terminal location information from the information storage unit 108, receives the song number from the input unit 109 and the TOC information from the CD read unit 107, and transmits the received song number and TOC information, and the read terminal location information to the directory server 20 via the Internet 60.

The transmission unit 106 receives the distribution server location information, the ISRC number, and the directory server name from the reception unit 101. Here, the distribution server location information is identification information for identifying the content distribution server 30, and the directory server name is identification information for identifying the directory server 20. Upon receipt of the distribution server location information, the ISRC number, and the directory server name, the transmission unit 106 reads a terminal ID and user information from the information storage unit 108. The transmission unit 106 then transmits the received ISRC number and directory server name, and the read terminal ID and user information to the device identified by the received distribution server location information, i.e., the content distribution server 30, via the Internet 60.

The transmission unit 106 receives the additional-information distribution server location information from the read unit 104. Upon receipt of this information, the transmission unit 106 transmits the read terminal location information and terminal ID, the extracted content distribution server name, the received ISRC number and user information to the device identified by the extracted additional-information distribution server location information, i.e., the additional-information distribution server 40, via the Internet 60. Also, when receiving additional information from the additional-information distribution server 40, the transmission unit 106 transmits payment information to the settlement server 50 via the Internet 60. Here, the payment information shows a payment to be made to the additional-information distribution server 40, for additional information distributed from the additional-information distribution server 40.

When the CD read unit judges that the CD stores information in its CD-DA region and also stores information in its CD-ROM region, the transmission unit 106 reads the terminal ID and the terminal location information from the information storage unit 108.

Upon receipt of the key distribution server name and the ISRC number from the read unit 104, the transmission unit 106 generates a decryption key distribution request, and transmits the read terminal ID and terminal location information, the decryption key distribution request, and the ISRC number to the device identified by the read key distribution server name, i.e., the content distribution server 30, via the Internet 60.

(6) Reception Unit 101

The reception unit 101 receives the distribution server location information, the ISRC number, and the directory server name from the directory server 20 via the Internet 60, and outputs the received distribution server location information, ISRC number, and directory server name to the transmission unit 106.

Also, the reception unit 101 receives the decryption key and the content from the content distribution server 30 via the Internet 60, and writes the received decryption key and content to the content storage unit 102 in an interrelated manner.

Here, the reception unit 101 transmits and receives the decryption key using a secure communication protocol such as the SSL (Secure Socket Layer).

Also, the reception unit 101 receives a file from the additional-information distribution server 40 via the Internet 60, and writes the received file to the content storage unit 102.

Also, the reception unit 101 receives the decryption key from the content distribution server 30 via the Internet 60, and writes the received decryption key to the content storage unit 102.

(7) Read Unit 104

The read unit 104 reads the content from the content storage unit 102, and extracts the additional-information distribution server location information and the content distribution server name from the read content, and outputs the extracted additional-information distribution server location information and content distribution server name to the transmission unit 106.

(8) Reproduction Unit 103

The reproduction unit 103 reads the content and the decryption key from the content storage unit 102, and decrypts the content using the read decryption key to acquire audio, and reproduces the audio. The reproduction unit 103 also reads a file from the content storage unit 102, decrypts the read file to acquire video, and reproduces the video.

Also, the reproduction unit 103 reproduces music information that has been converted in the format specified by the MP3.

(9) Conversion Unit 105

The conversion unit 105 receives music information from the CD read unit 107, converts the received music information into music information in the format specified by the MP3, and writes the converted music information to the content storage unit 102.

Here, the conversion unit 105 converts the music information into the format based on the MP3, but the conversion unit 105 may convert the music information into formats based on other music compression CODECs, such as the AAC (Advanced Audio Coding), the ATRAC3 (Adaptive Transform Acoustic Coding), and the Twin VQ (Transform-domain Weighed Interleave Vector Quantization).

(10) Content Storage Unit 102

The content storage unit 102 has a region for storing content and a decryption key in an interrelated manner, and also a region for storing music information that has been converted into the format specified by the MP3.

Here, the decryption key is recorded in a secure region that cannot be viewed by a normal user access.

1.2 Directory Server 20

Figure 5:
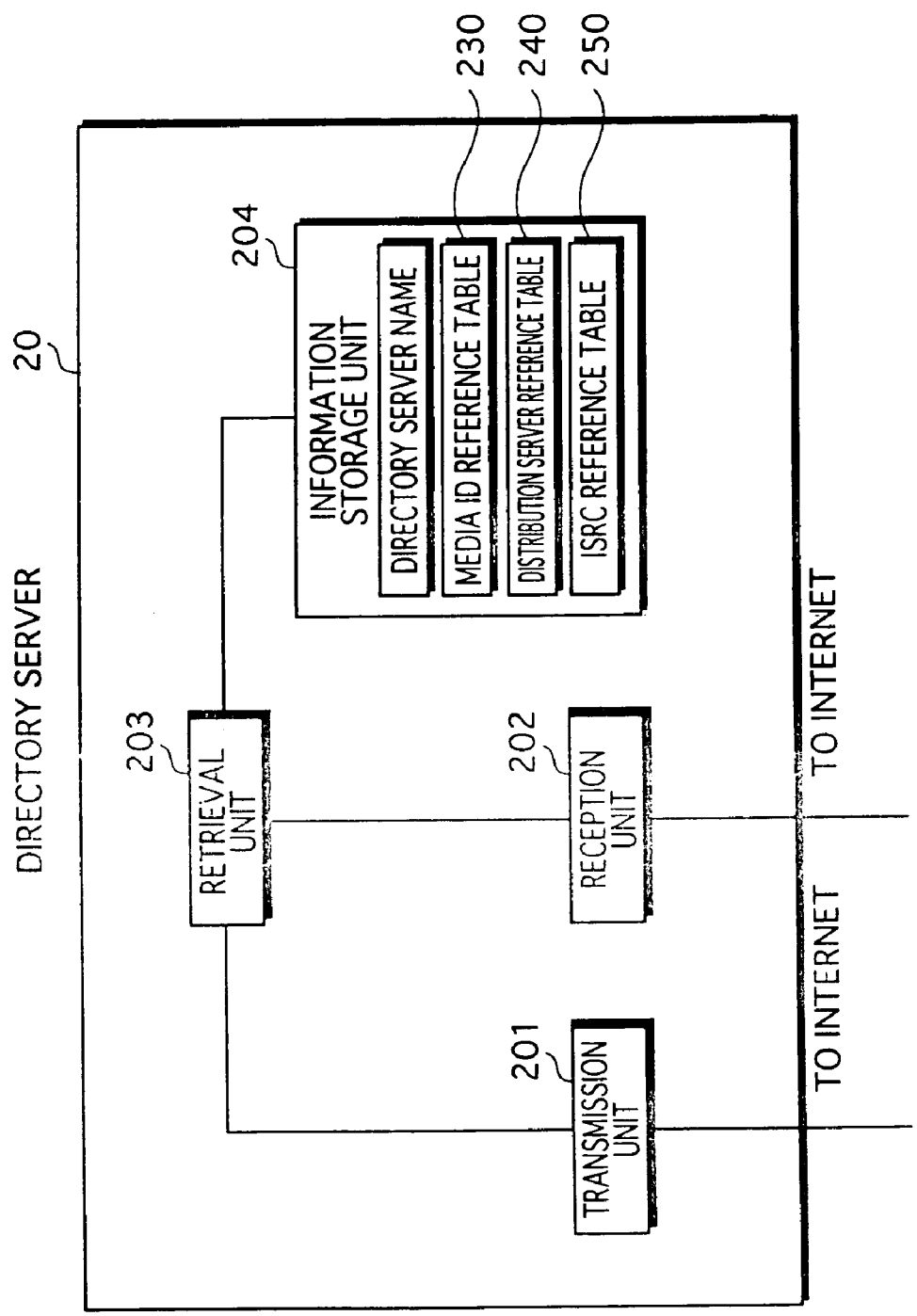
FIG. 5 is a block diagram showing the construction of a directory server 20.

As FIG. 5 shows, the directory server 20 includes a transmission unit 201, a reception unit 202, a retrieval unit 203, and an information storage unit 204.

The directory server 20 is specifically a computer system that is the same as the information processing terminal 10. Accordingly, the functions of the directory server 20 are realized by the microprocessor operating according to a computer program.

The directory server 20 is operated independently from the content distribution server 30. The operator of the directory server 20 has a contract with operators of a plurality of content distribution servers. The directory server 20 introduces the content distribution server 30 to the user, which enables the user who has a CD, to acquire content that is the same as data acquired by ripping the CD without doing so.

(1) Information Storage Unit 204

The information storage unit 204 is specifically constructed by a hard disk unit, and prestores a directory server name, a media ID reference table 230, a distribution server reference table 240, and an ISRC reference table 250.

(Directory Server Name)

The directory server name is an identification name for identifying the directory server 20.

(Media ID Reference Table 230)

As FIG. 6 shows an example, the media ID reference table 230 includes at least one information-set consisting of a media ID, an offset, and a total time period.

The media ID is identification information for identifying a type of a CD.

The offset includes at least one logical sector address, and each logical sector address indicates the start point of a region in which a piece of music information is stored.

The total time period is a time period taken to reproduce all pieces of music information stored in the CD-DA region of the CD.

(Distribution Server Reference Table 240)

As FIG. 7 shows an example, the distribution server reference table 240 includes at least one information-set consisting of a media ID and distribution server location information.

As described above, the media ID is identification information for identifying a type of a CD.

The distribution server location information is identification information that identifies a content distribution server connected on the Internet 60. To be more specific, the distribution location information is a URL (Uniform Resource Locator).

(ISRC Reference Table 250)

As FIG. 8 shows an example, the ISRC reference table 250 includes at least one information-set consisting of a media ID, a song number, and an ISRC number.

As described above, the media ID is identification information for identifying a type of a CD.

The song number is a number for identifying a piece of music information, i.e., a song, within a CD.

The ISRC number is not explained here as it is explained early in this specification.

(2) Reception Unit 202

The reception unit 202 receives the song number, the TOC information, and the terminal location information from the information processing terminal 10 via the Internet 60, and outputs the received song number and TOC information to the retrieval unit 203, and the received terminal location information to the transmission unit 201.

(3) Retrieval Unit 203

The retrieval unit 203 reads the directory server name from the information storage unit 204. The retrieval unit 203 then receives the TOC information from the reception unit 202, extracts an information-set consisting of an offset and a total time period that are the same as shown in the TOC information from the media ID reference table 230 stored in the information storage unit 204, and acquires a media ID interrelated with the extracted information-set.

The retrieval unit 203 then acquires distribution server location information interrelated with the acquired media ID from the distribution server reference table 240 stored in the information storage unit 204.

The retrieval unit 203 then acquires an ISRC number interrelated with the acquired media ID and the received song number from the ISRC reference table 250 stored in the information storage unit 204.

The retrieval unit 203 then outputs the acquired distribution server location information and ISRC number, and the read directory server name to the transmission unit 201.

(4) Transmission Unit 201

The transmission unit 201 receives the distribution server location information, the ISRC number, and the directory server name from the retrieval unit 203, and transmits the received distribution server location information, ISRC number and directory server name to the device identified by the received terminal location information, i.e., the information processing terminal 10.

1.3 Content Distribution Servers 30a, 30b, 30c, . . . .

The content distribution servers 30a, 30b, 30c, . . . each are the same device, and so the following describes these servers by simply referring to the content distribution server 30.

Figure 9:
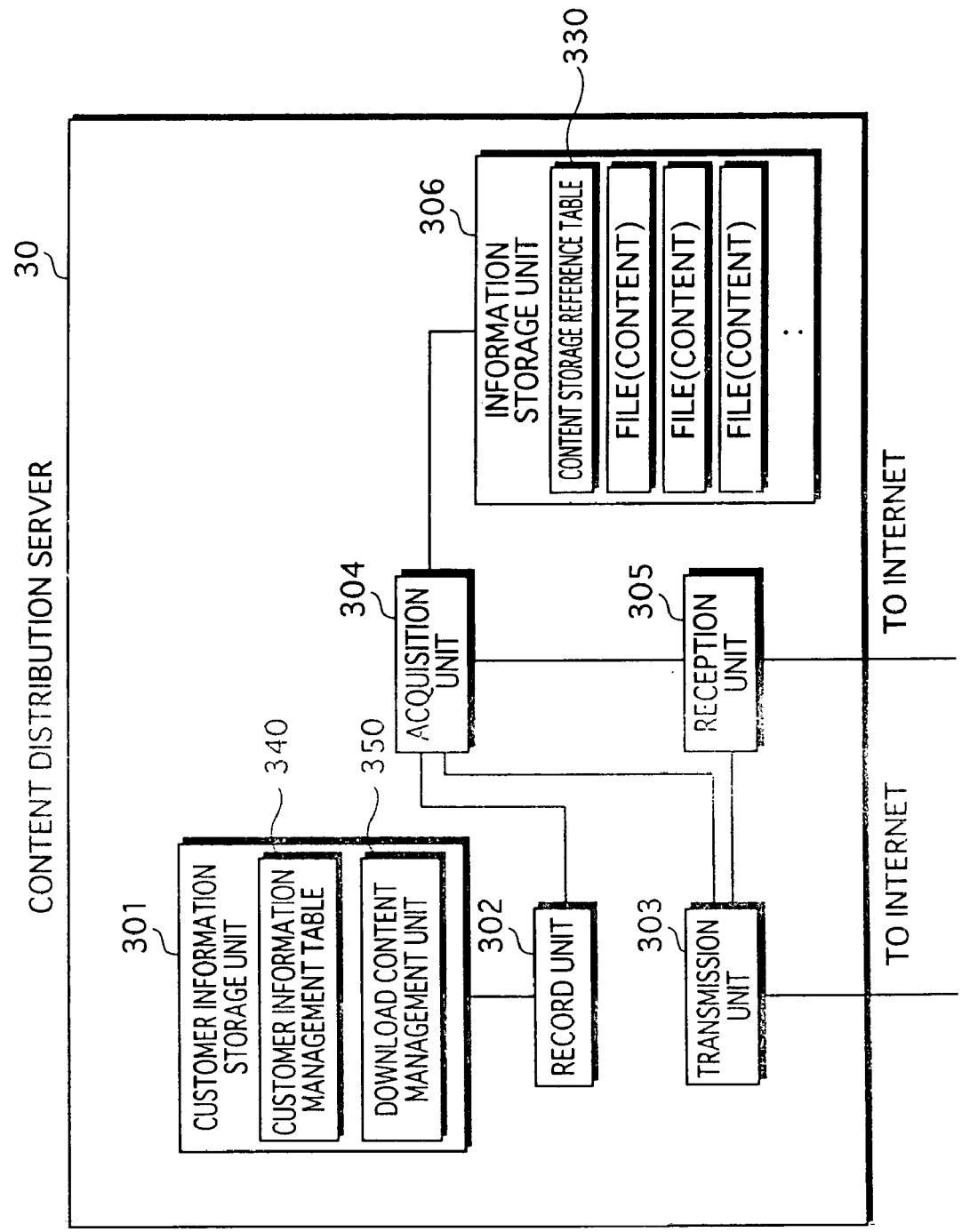
FIG. 9 is a block diagram showing the construction of a content distribution server 30.

As FIG. 9 shows, the content distribution server 30 includes a customer information storage unit 301, a record unit 302, a transmission unit 303, an acquisition unit 304, a reception unit 305, and an information storage unit 306. The content distribution server 30 is a Website that distributes content to the user. The content distribution server 30 adds location information to the content to be distributed to the user. The location information indicates a site (additional-information server 40) for distributing the latest information, karaoke data, image data, and the like relating to the content. The content distribution server 30 receives profits according to the count value of sales made on this site (additional-information server 40).

The content distribution server 30 is specifically a computer system that is the same as the information processing terminal 10. Accordingly, the functions of the content distribution server 30 are realized by the microprocessor operating according to a computer program.

(1) Information Storage Unit 306

The information storage unit 306 is specifically constructed by a hard disk unit, and stores a content storage reference table 330 and at least one file (content).

A file (content) is not explained here because it is the same as the content shown in FIG. 4.

(Content Storage Reference Table 330)

As FIG. 10 shows an example, the content storage reference table 330 includes at least one information-set consisting of an ISRC number, a file name, and a decryption key.

The ISRC number is as explained early in this specification.

The file name is made up of location information and identification information for a file stored in the information storage unit 306.

The decryption key is key information used to decrypt song data included in the file (content) identified by the file name included in the same information-set.

(2) Customer Information Storage Unit 301

The customer information storage unit 301 is specifically constructed by a hard disk unit, and stores a customer information management table 340 and a download content management table 350.

(Customer Information Management Table 340)

As FIG. 11 shows an example, the customer information management table 340 has a region for storing at least one information-set consisting of a terminal ID and customer information.

The terminal ID is identification information for identifying an information processing terminal.

The customer information is information relating to a user of the information processing terminal identified by the terminal ID included in the same information-set, and includes a name, an address, and a telephone number of the user.

(Download Content Management Table 350)

As FIG. 12 shows an example, the download content management table 350 has a region for storing at least one information-set consisting of a terminal ID, a download content file name, and a directory server name.

The terminal ID is as explained above.

The download content file name is a file name of content transmitted to the information processing terminal identified by the terminal ID included in the same information-set.

The directory server name is a name of a directory server introduced by the information processing terminal identified by the terminal ID included in the same information-set when the content is transmitted to the information processing terminal.

(3) Reception Unit 305

The reception unit 305 receives the ISRC number, the directory server name, the terminal location information, the terminal ID, and the user information from the information processing terminal 10 via the Internet 60, and outputs the received ISRC number, directory server name, terminal location information, terminal ID, and user information to the acquisition unit 304.

Also, the reception unit 305 receives the terminal ID, the terminal location information, the decryption key distribution request, and the ISRC number from the information processing terminal 10 via the Internet 60, and outputs the received terminal ID, terminal location information, decryption key distribution request, and ISRC number to the acquisition unit 304, and the received terminal location information to the transmission unit 303.

(4) Acquisition Unit 304

The acquisition unit 304 receives the ISRC number, the directory server name, the terminal location information, the terminal ID, and the user information from the reception unit 305. Upon receipt of the listed information, the acquisition unit 304 extracts a file name and a decryption key interrelated with the received ISRC number from the content storage reference table 330 stored in the information storage unit 306, and reads a file, i.e., content, identified by the extracted file name from the information storage unit 306. The acquisition unit 304 then outputs the extracted decryption key and the read content to the transmission unit 303.

Also, the acquisition unit 304 receives the terminal ID, the terminal location information, the decryption key distribution request, and the ISRC number from the reception unit 305. Upon receipt of the listed information, the acquisition unit 304 acquires a decryption key interrelated with the received ISRC number from the content storage reference table 330 stored in the information storage unit 306, and outputs the acquired decryption key to the transmission unit 303.

The acquisition unit 304 then outputs the received user information and terminal ID, the extracted file name, and the received directory server name to the record unit 302.

(5) Transmission Unit 303

The transmission unit 303 receives the decryption key and the content from the acquisition unit 304. Upon receipt of the decryption key and content, the transmission unit 303 transmits the received decryption key and content to the device identified by the received terminal location information, i.e., the information processing terminal 10, via the Internet 60.

Here, the transmission unit 303 transmits and receives the decryption key using a secure communication protocol such as the SSL.

The transmission unit 303 then transmits "payment information to directory server" to the settlement server 50 via the Internet 60. Here the "payment information to directory server" is information showing a payment for the information processing terminal 10 being introduced to the content distribution server 30 by the directory server.

Also, the transmission unit 303 receives the terminal location information from the reception unit 305 and the decryption key from the acquisition unit 304, and transmits the received decryption key to the device identified by the received terminal location information via the Internet 60.

(6) Record Unit 302

The record unit 302 receives the terminal ID, the file name, the directory server name, and the user information from the acquisition unit 304, and writes the received terminal ID, file name, and directory server to the download content management unit 350 in an interrelated manner. Also, the record unit 302 writes the received terminal ID and user information, as the terminal ID and customer information, to the customer information management unit 340 in an interrelated manner.

1.4 Additional-Information Distribution Server 40

Figure 13:
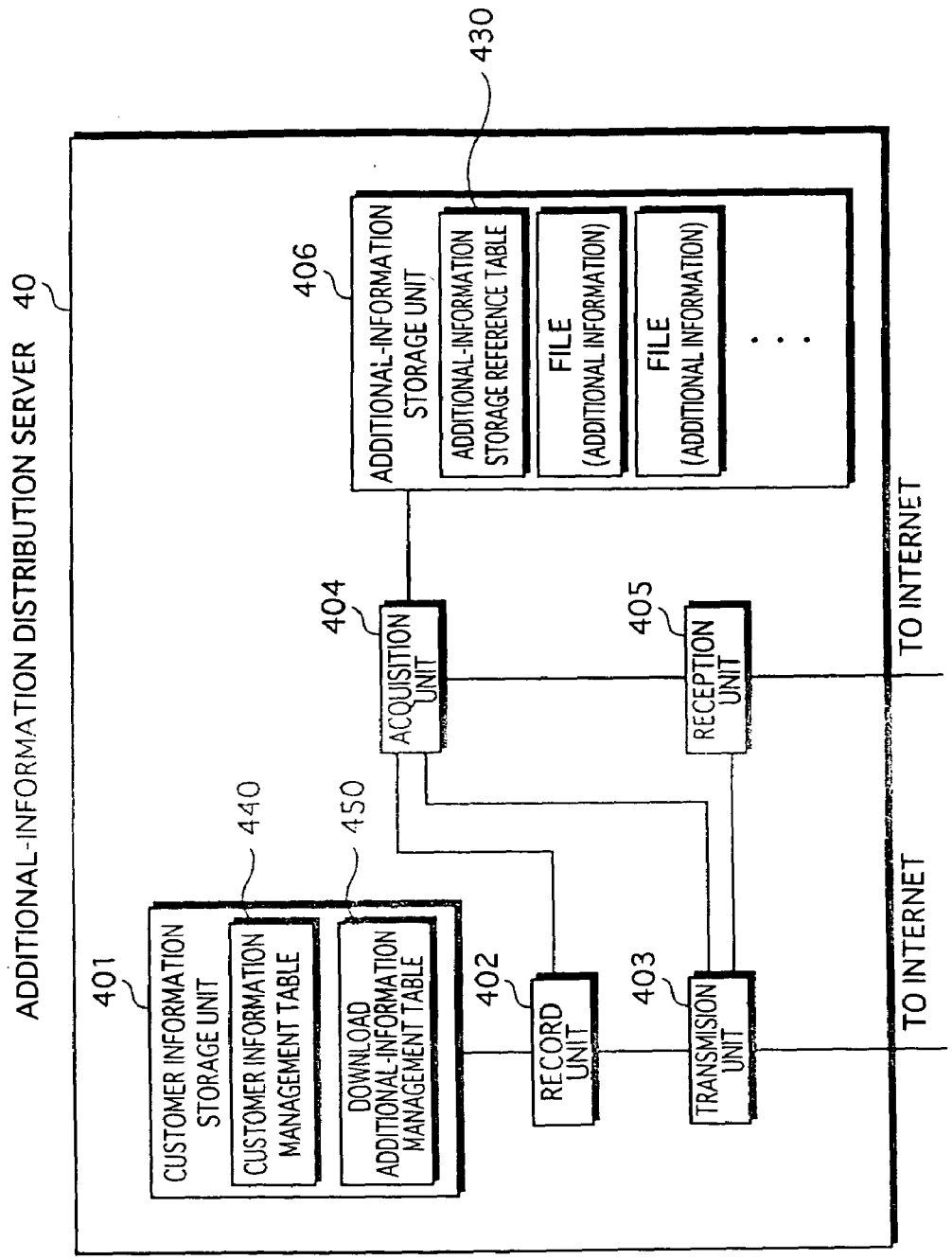
FIG. 13 is a block diagram showing the construction of an additional-information distribution server 40.

As FIG. 13 shows, the additional-information distribution server 40 includes a customer information storage unit 401, a record unit 402, a transmission unit 403, an acquisition unit 404, an additional-information storage unit 406, and a reception unit 405. The additional-information distribution server 40 is a Website that provides additional information relating to content.

The additional-information distribution server 40 is specifically a computer system that is the same as the information processing terminal 10. Accordingly, the functions of the additional-information distribution server 40 are realized by the microprocessor operating according to a computer program.

(1) Additional-Information Storage Unit 406

The additional-information storage unit 406 is specifically constructed by a hard disk unit, and stores at least one file (additional information) and an additional-information storage reference table 430.

The file includes additional information. Here, the additional information is information relating to content as described above, and, for example, may be a still image, a moving image, or karaoke data relating to song data included in the content, or may be character information indicating lyrics of song data included in the content.

(Additional-Information Storage Reference Table 430)

As FIG. 14 shows an example, the additional-information storage reference table 430 includes at least one information-set consisting of an ISRC number and a file name.

The ISRC number is not explained here as it is explained early in this specification.

The file name is identification information for identifying a file stored in the additional-information storage unit 406.

(2) Customer Information Storage Unit 401

The customer information storage unit 401 is specifically constructed by a hard disk unit, and stores a customer information management table 440 and a download additional-information management table 450.

(Customer Information Management Table 440)

As FIG. 15 shows an example, the customer information management table 440 has a region for storing at least one information-set consisting of a terminal ID and customer information.

The terminal ID and the customer information are not explained here as they are explained early in this specification.

(Download Additional-Information Management Table 450)

As FIG. 16 shows an example, the download additional-information management table 450 has a region for storing at least one information-set consisting of a terminal ID, a download content name, and a content distribution server name.

The terminal ID is not explained here as it is explained early in the specification.

The download content name is an identification name for identifying a file (additional information) transmitted to an information processing terminal identified by the terminal ID included in the same information-set from the additional-information distribution server 40.

The content distribution server name is the one transmitted from the information processing terminal identified by the terminal ID included in the same information-set.

(3) Reception Unit 405

The reception unit 405 receives the terminal location information, the terminal ID, the content distribution server name, the ISRC number, and the user information from the information processing terminal 10 via the Internet 60, and outputs the received terminal location information, terminal ID, content distribution server name, ISRC number, and user information to the acquisition unit 404. Also, the reception unit 405 receives verification information from the settlement server 50.

(4) Acquisition Unit 404

The acquisition unit 404 receives the terminal location information, the terminal ID, the content distribution server name, the ISRC number, and the user information from the reception unit 405. Upon receipt of the listed information, the acquisition unit 404 acquires a file name interrelated with the received ISRC number, from the additional-information storage reference table 430 stored in the additional-information storage unit 406, and reads a file (additional information) identified by the acquired file name from the additional-information storage unit 406.

Also, the acquisition unit 404 outputs the received terminal location information and the acquired file to the transmission unit 403.

Also, the acquisition unit 404 outputs the file name, the content distribution server name, the terminal ID, and the user information to the record unit 402.

(5) Record Unit 402

The record unit 402 receives the file name, the content distribution server name, the terminal ID, and the user information from the acquisition unit 404, and writes the received file name, content distribution server name, and terminal ID to the down load additional-information management unit 450 stored in the customer information storage unit 401 in an interrelated manner. Also, the record unit 402 writes the received terminal ID and user information, as the terminal ID and customer information, to the customer information management table 440 stored in the customer information storage unit 401 in an interrelated manner.

(6) Transmission Unit 403

The transmission unit 403 receives the terminal location information and the file from the acquisition unit 404. Upon receipt) of this information, the transmission unit 403 transmits the received file to the device identified by the received terminal location information, i.e., the information processing terminal 10, via the Internet 60.

Also, the transmission unit 403 transmits "payment information to content distribution server" to the settlement server 50 via the Internet 60. Here the "payment information to content distribution server" is information showing a payment for the information processing terminal 10 being introduced to the additional information distribution server 40 by the content distribution server.

1.5 Settlement Server 50

Figure 17:
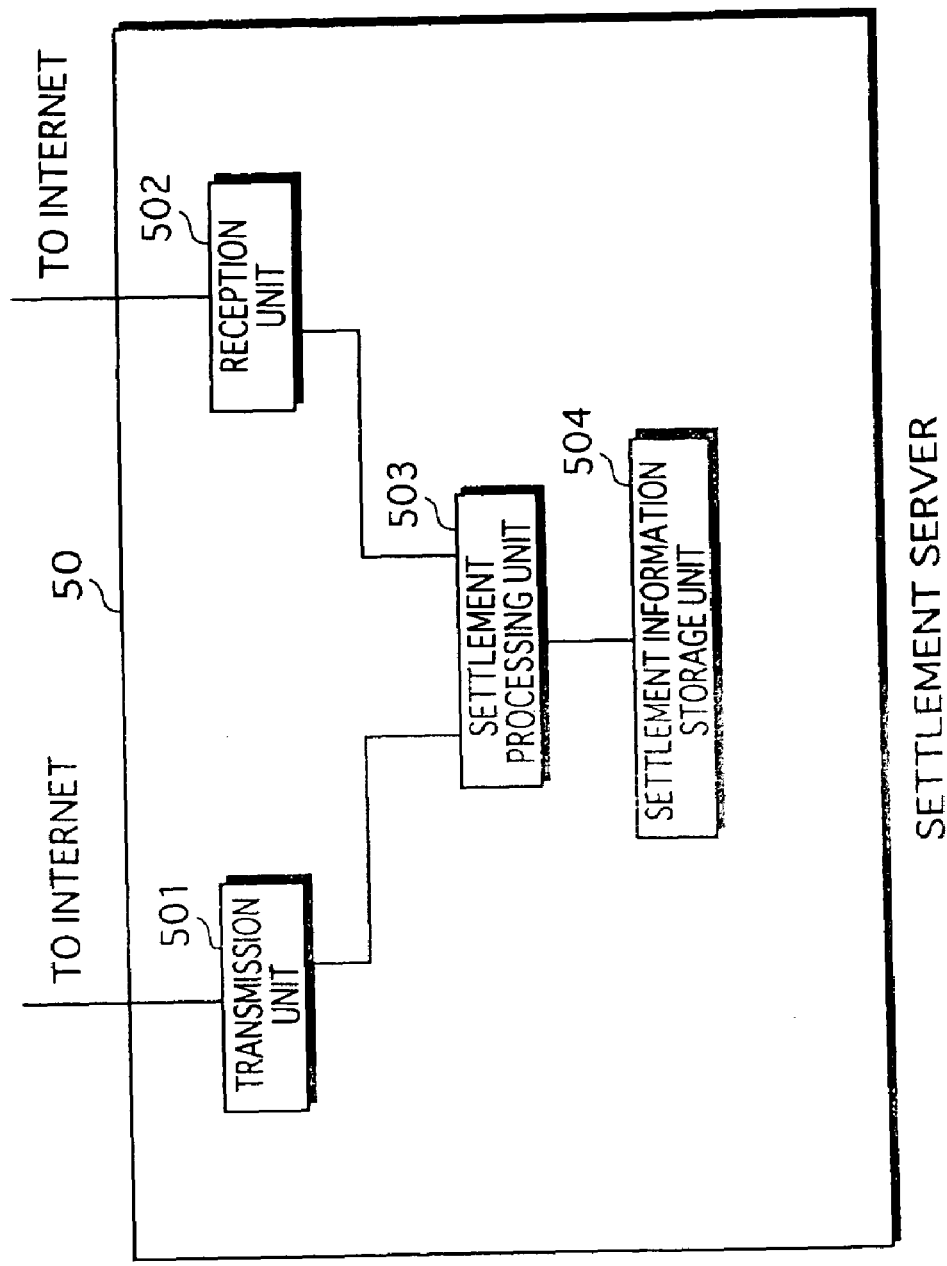
FIG. 17 is a block diagram showing the construction of a settlement server 50.
Figure 18:
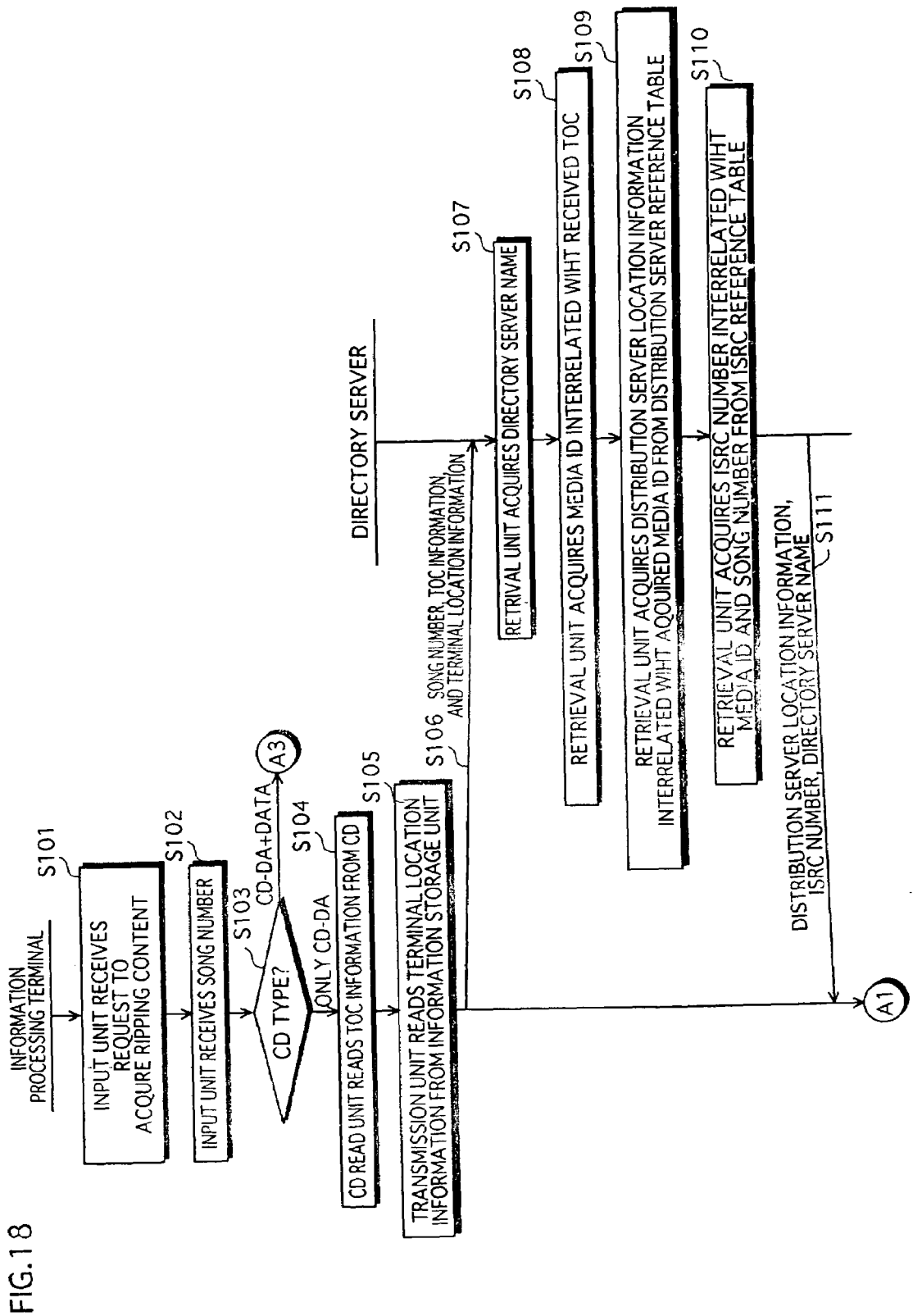
FIG. 18 shows a flowchart of the operations of the digital data distribution system 1, continuing to FIG. 19.
Figure 19:
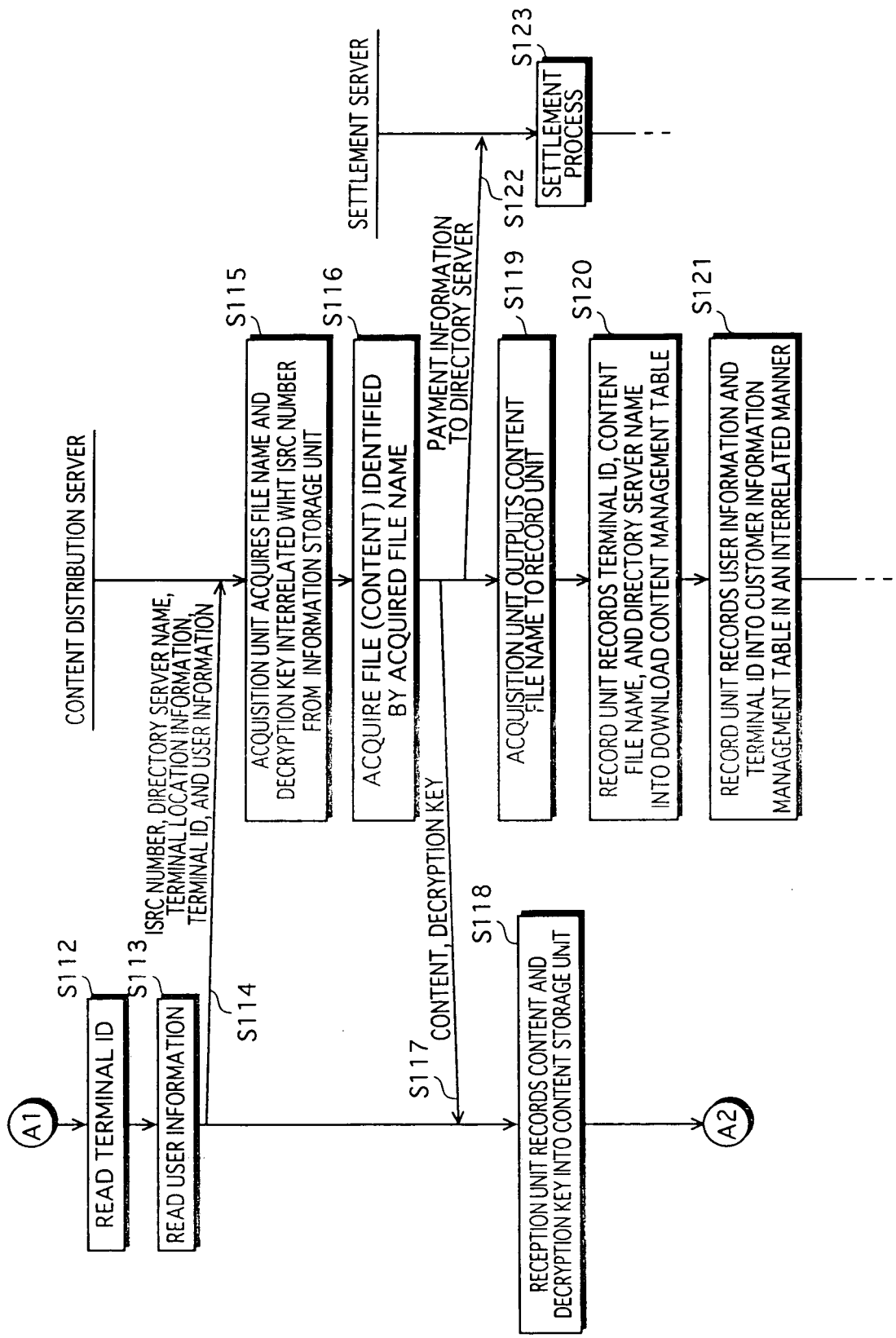
FIG. 19 shows a flowchart of the operations of the digital data distribution system 1, continuing to FIG. 20.
Figure 20:
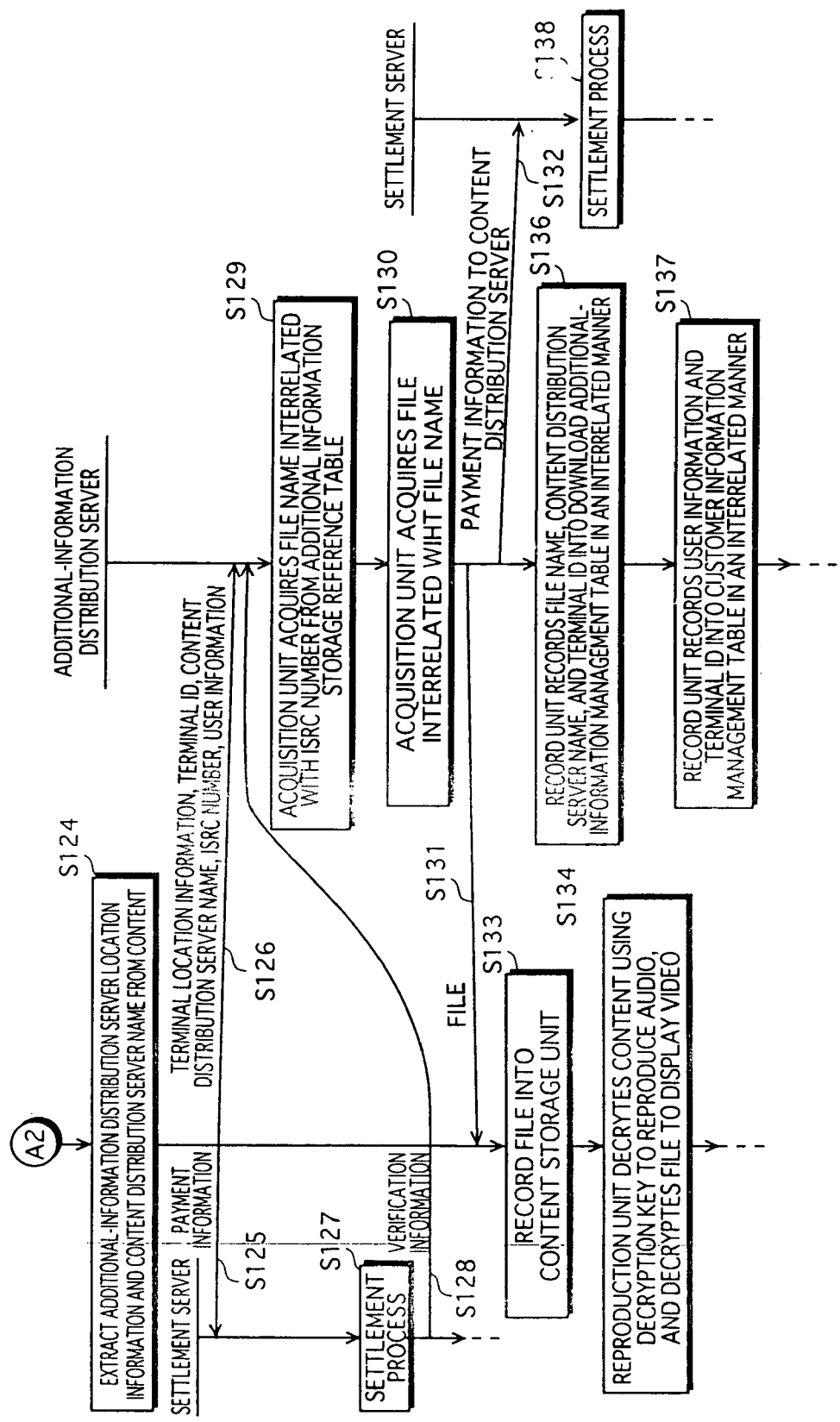
FIG. 20 shows a flowchart of the operations of the digital data distribution system 1, continuing to FIG. 21.
Figure 21:
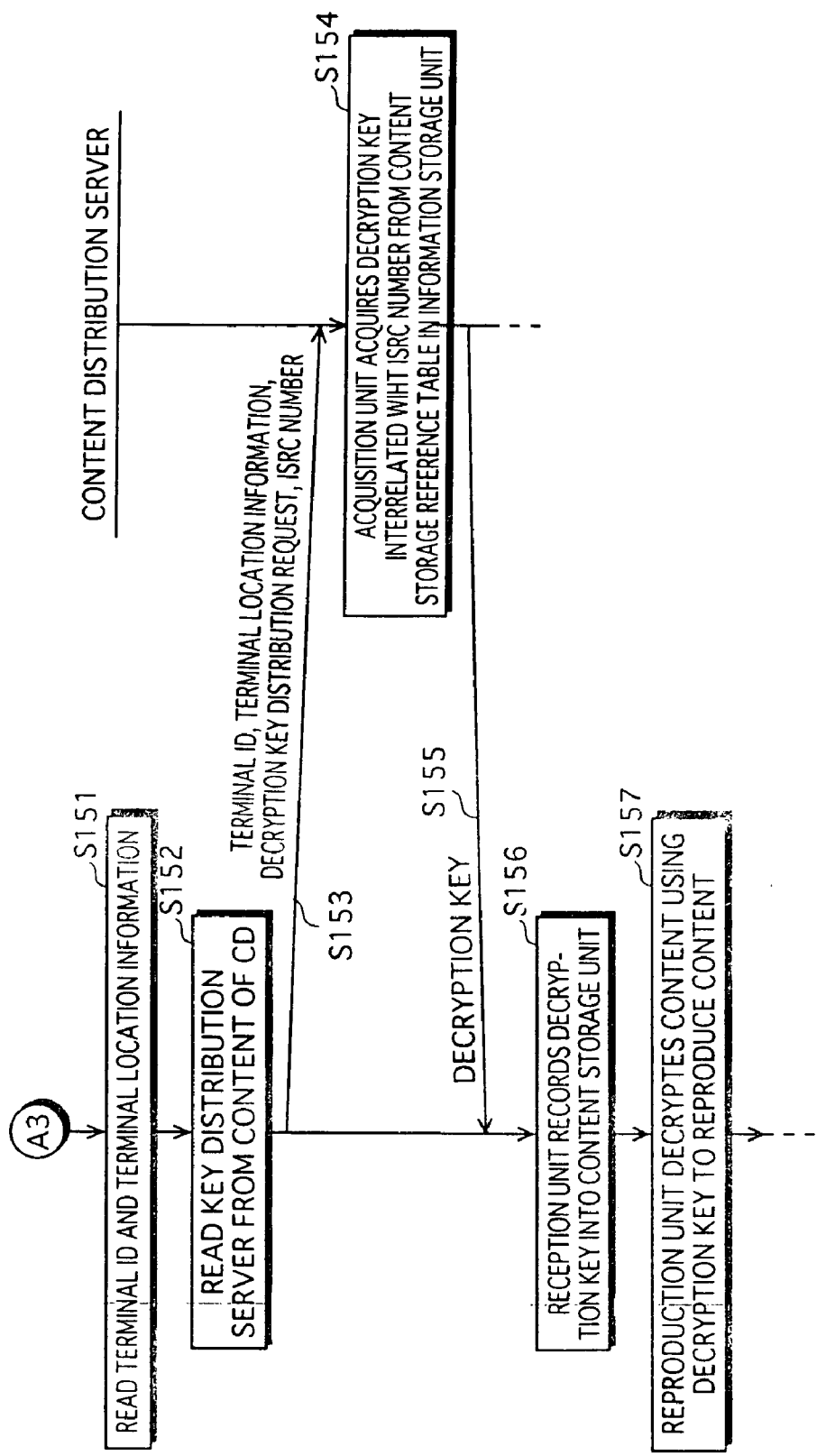
FIG. 21 shows a flowchart of the operations of the digital data distribution system 1, continuing from FIG. 20.

As FIG. 17 shows, the settlement server 50 includes a transmission unit 501, a reception unit 502, a settlement processing unit 503, and a settlement information storage unit 504.

The settlement server 50 is specifically a computer system that is the same as the information processing terminal 10. Accordingly, the functions of the settlement server 50 are realized by the microprocessor operating according to a computer program.

(1) Reception Unit 502

The reception unit 502 receives "payment information to directory server" from the content distribution server 30 via the Internet 60, and outputs the received "payment information to directory server" to the settlement processing unit 503.

Also, the reception unit 502 receives payment information from the information processing terminal 10 via the Internet 60, and outputs the received payment information to the settlement processing unit 503.

Also, the reception unit 502 receives "payment information to content distribution server" from the additional-information distribution server 40 via the Internet 60, and outputs the received "payment information to content distribution server" to the settlement processing unit 503.

(2) Settlement Processing Unit 503

The settlement processing unit 503 receives the "payment information to directory server" from the reception unit 503, and performs a settlement process based on the received "payment information to directory server".

Also, the settlement processing unit 503 receives the payment information from the reception unit 502, performs a settlement process based on the received payment information, generates verification information indicating that the settlement has been completed, and outputs the generated verification information to the transmission unit 501.

Also, the settlement processing unit 503 receives the "payment information to content distribution server" from the reception unit 502, and performs a settlement process based on the received "payment information to content distribution server".

(3) Transmission Unit 501

The transmission unit 501 receives the verification information from the settlement processing unit 503, and transmits the received verification information to the additional-information distribution server 40.

(4) Settlement Information Storage Unit 504

The settlement information storage unit 504 stores information relating to the settlement process that has been performed by the settlement processing unit 503.

1. Operations of the Digital Data Distribution System 1

The following describes the operations of the digital data distribution system 1, with reference to flowcharts shown in FIGS. 18 to 21.

The input unit 109 in the information processing terminal 10 receives, from the user, an input of an acquisition request to acquire ripping content, and outputs the received acquisition request to the CD read unit 107 and the transmission unit 106 (step S101). Also, the input unit 109 receives an input of a song number from the user, and outputs the received song number to the transmission unit 106 (step S102).

Upon receipt of the acquisition request, the CD read unit 107 judges a type of a CD that is mounted upon the information processing terminal 110 (step S103). When judging that the CD stores only information in its CD-DA region, the CD read unit 107 reads TOC information from the CD that is mounted upon the information processing terminal 10, and outputs the read TOC information to the transmission unit 106 (step S104).

Upon receipt of the acquisition request from the input unit 109, the transmission unit 106 reads terminal location information from the information storage unit 108 (step S105), and further receives the song number from the input unit 109 and the TOC information from the CD read unit 107. The transmission unit 106 then transmits the received song number and TOC information, and the read terminal location information, to the directory server 20 via the Internet 60 (step S106).

The reception unit 202 in the directory server 20 receives the song number, the TOC information, and the terminal location information from the information processing terminal 10 via the Internet 60, and outputs the received song number and TOC information to the retrieval unit 203, and the received terminal location information to the transmission unit 201 (step S106).

The retrieval unit 203 reads the directory server name from the information storage unit 204 (step S107). Following this, the retrieval unit 203 receives the TOC information from the reception unit 202, extracts an information-set consisting of an offset and a total time period that are the same as shown in the received TOC information from the media ID reference table 230 stored in the information storage unit 204, and acquires a media ID interrelated with the extracted information-set (step S108). The retrieval unit 203 then acquires distribution server location information interrelated with the acquired media ID from the distribution server reference table 240 stored in the information storage unit 204 (step S109). Following this, the retrieval unit 203 acquires an ISRC number interrelated with the acquired media ID and the received song number from the ISRC reference table 250 stored in the information storage unit 204 (step S110). The retrieval unit 203 then outputs the acquired distribution server location information, the acquired ISRC number, and the read directory server name to the transmission unit 201. The transmission unit 201 receives the distribution server location information, the ISRC number, and the directory server name from the retrieval unit 203, and outputs the received distribution server location information, ISRC number, and directory server name to the device identified by the received terminal location information (step S111).

The reception unit 101 in the information processing terminal 10 receives the distribution server location information, the ISRC number, and the directory server name from the directory server 20, and outputs the received distribution server location information, ISRC number, and directory server name, to the transmission unit 106 (step S111).

The transmission unit 106 reads the terminal ID from the information storage unit 108 (step S112), reads the user information (step S113), and transmits the received ISRC number and directory server name, the read terminal location information, terminal ID, and user information, to the device identified by the received distribution server location information via the Internet 60 (step S114).

The reception unit 305 in the content distribution server 305 receives the ISRC number, the directory server name, the terminal location information, the terminal ID, and the user information from the information processing terminal 10 via the Internet 60, and outputs the received ISRC number, directory server, terminal location information, terminal ID, and user information to the acquisition unit 304 (step S114).

The acquisition unit 304 extracts a file name and a decryption key interrelated with the received ISRC number from the content storage reference table 330 stored in the information storage unit 306 (step S115), and reads a file, i.e., content, identified by the extracted file name from the information storage unit 306 (step S116).

Following this, the acquisition unit 304 outputs the extracted decryption key and the read content to the transmission unit 303. The transmission unit 303 receives the decryption key and the content, and outputs the received decryption key and content to the device identified by the received terminal location information via the Internet 60 (step S117).

Following this, the transmission unit 303 transmits "payment information to directory server" to the settlement server 50 via the Internet 60 (step S122).

Following this, the acquisition unit 304 outputs the received user information, the received terminal ID, the extracted file name and the received directory server name to the record unit 302 (step S119). The record unit 302 receives the terminal ID, the file name, and the directory server name from the acquisition unit 304, writes the received terminal ID, file name, and directory server to the download content management unit 350 in an interrelated manner (step S120), and writes the received user information and terminal ID to the customer information management unit 340 in an interrelated manner (step S121).

The reception unit 502 in the settlement server 50 receives "payment information to directory server" from the content distribution server 30 via the Internet 60 (step S122). The settlement processing unit 503 performs a settlement process based on the received "payment information to directory server" (step S123).

The reception unit 101 in the information processing terminal 10 receives the decryption key and the content from the content distribution server 30 via the Internet 60 (step S117), and writes the received decryption key and content to the content storage unit 102 in an interrelated manner (step S118).

The read unit 104 reads the content from the content storage unit 102, extracts additional-information distribution server location information and a content distribution server name from the read content, and outputs the extracted additional-information distribution server location information and content distribution server name to the transmission unit 106 (step S124). The transmission unit 106 transmits the read terminal location information, the read terminal ID, the extracted content distribution server name, the received ISRC number, and the read user information, to the device identified by the extracted additional-information distribution server location information via the Internet 60 (step S126).

Also, the transmission unit 106 transmits payment information showing a payment to be made to the additional-information distribution server 40, to the settlement server 50 via the Internet 60 (step S125).

The reception unit 502 in the settlement server 50 receives the payment information from the information processing terminal 10 via the Internet 60, and the settlement processing unit 503 performs a settlement process based on the received payment information (step S127). The transmission unit 501 transmits verification information to the additional-information distribution server 40 via the Internet 60 (step S128).

The reception unit 405 in the additional-information distribution server 40 receives the terminal location information, the terminal ID, the content distribution server name, the ISRC number, and the user information from the information processing terminal 10 via the Internet 60, and outputs the received terminal location information, terminal ID, content distribution server name, ISRC number, and user information, to the acquisition unit 404 (step S126). Also, the reception unit 405 receives the verification information from the settlement server 50 (step S128).

Following this, the acquisition unit 404 acquires a file name interrelated with the received ISRC number from the additional-information storage reference table 430 stored in the additional-information storage unit 406 (step S129), and reads a file identified by the acquired file name from the additional-information storage unit 406 (step S130).

The acquisition unit 404 outputs the received terminal location information and the acquired file to the transmission unit 403. The transmission unit 403 transmits the acquired file to the device identified by the received terminal location information via the Internet 60 (step S131).

Also, the transmission unit 403 transmits the "payment information to content distribution server" to the settlement server 50 via the Internet 60 (step S132).

Also, the acquisition unit 404 outputs the file name, the content distribution server name, the terminal ID, and the user information to the record unit 402. The record unit 402 receives the file name, the content, the distribution server name, the terminal ID, and the user information, writes the received file name, content distribution server, and terminal ID to the download additional-information management unit 450 stored in the customer information storage unit 401 in an interrelated manner (step S136), and writes the received user information and terminal ID to the customer information management table 440 stored in the customer information storage unit 401 in an interrelated manner (step S137).

The reception unit 502 in the settlement server 50 receives the "payment information to content distribution server" from the additional-information distribution server 40 via the Internet 60 (step S132), and the settlement processing unit 503 performs a settlement process based on the received "payment information to content distribution server" (step S138).

The reception unit 101 in the information processing terminal 10 receives a file from the additional-information distribution server 40 via the Internet 60 (step S131), and writes the received file to the content storage unit 102 (step S133).

Following this, the reproduction unit 103 reads the content and the decryption key from the content storage unit 102, decrypts the read content using the read decryption key to acquire audio, and reproduces the audio. The reproduction unit 103 then reads the file from the content storage unit 102, decrypts the read file to acquire video, and reproduces the video (step S135).

The CD read unit 107 in the information processing terminal 10 judges a type of a CD that is mounted upon the information processing terminal 10 (step S103). When judging that the CD stores both information in its CD-DA and information in its CD-ROM region, the transmission unit 106 reads the terminal ID and the terminal location information from the information storage unit 108 (step S151). The CD read unit 107 reads a key distribution server name and an ISRC number from the content recorded on the CD, and outputs the read key distribution server name and ISRC number to the transmission unit 106 (step S152). Following this, the transmission unit 106 generates a decryption key distribution request, and transmits the terminal ID, the terminal location information, the decryption key distribution request, and the ISRC number, to the device identified by the read key distribution server name (step S153).

The reception unit 305 in the content distribution server 30 receives the terminal ID, the terminal location information, the decryption key distribution request, and the ISRC number from the information processing terminal 10 via the Internet 60, and outputs the received terminal ID, terminal location information, decryption key distribution request, and ISRC number to the acquisition unit 304, and the received terminal location information to the transmission unit 303 (step S153).

The acquisition unit 304 acquires a decryption key interrelated with the received ISRC number from the content storage reference table 330 stored in the information storage unit 306, and outputs the acquired decryption key to the transmission unit 303 (step S154).

The transmission unit 303 receives the terminal location information from the reception unit 305, and the decryption key from the acquisition unit 304, and transmits the received decryption key to the device identified by the received terminal location information via the Internet 60 (step S155).

The reception unit 101 in the information processing terminal 10 receives the decryption key from the content distribution server 30 via the Internet 60 (step S155), and writes the received decryption key to the content storage unit 102 (step S156). The reproduction unit 103 decrypts the content using the decryption key, and reproduces the content (step S157).

3. Overall Operations of the Digital Data Distribution System 1

Figure 22:
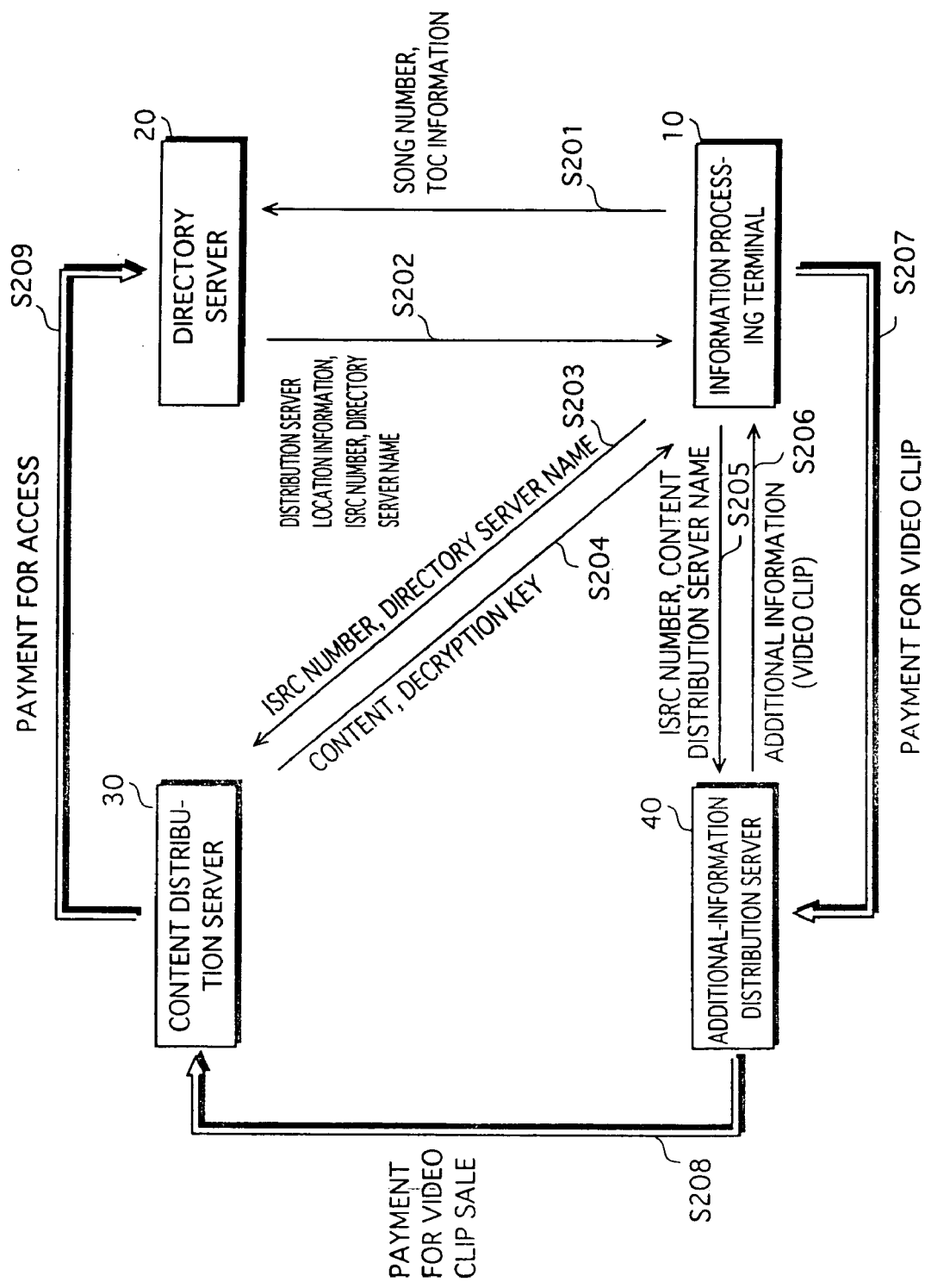
FIG. 22 is a conceptual diagram showing the overall operations of the digital data distribution system 1.

The following describes the overall operations of the digital data distribution system 1 focusing on main data transmitted and received between the components of the digital data distribution system 1, i.e., the information processing terminal 10, the directory server 20, the content distribution server 30, and the additional-information distribution server 40, with reference to FIG. 22.

The information processing terminal 10 transmits a song number and TOC information to the directory server 20 (step S201). The directory server 20 transmits distribution server location information, an ISRC number, and a directory server name to the information processing terminal 10 (step S202).

Following this, the information processing terminal 10 transmits the received ISRC number and directory server name to the content distribution server 30 identified by the received distribution server location information (step S203). The content distribution server 30 transmits content and a decryption key to the information processing terminal 10 (step S204).

Here, the content distribution server 30 performs a payment of an introduction fee to the directory server 20 for an access to the content distribution server 30 (step S209). The payment is made via the settlement server 50.

Following this, the information processing terminal 10 transmits the received ISRC number and content distribution server name to the additional-information distribution server 40 identified by the additional-information distribution server location information included in the received content (step S205). The additional-information distribution server 40 transmits additional information, for example, a video clip, to the information processing terminal 10 (step S206). Here, the information processing terminal 10 performs a payment to the additional-information distribution server 40 for the purchase of the video clip (step S207). This payment is made via the settlement server 50.

Also, the additional-information distribution server 40 performs a payment of an introduction fee to the content distribution server 30 for selling the video clip (step S208). This payment is made via the settlement server 50.

4. Modifications

The following describes a digital data distribution system 1A as a modified example of the digital data distribution system 1.

The digital data distribution system 1A has a similar construction as the digital data distribution system 1, and includes an information processing terminal 10A, a CD sales server 20A, a content distribution server 30A, an online store 40A, and a settlement server 50A (not illustrated). These devices are connected with one another via the Internet 60.

The information processing terminal 10A, the CD sales server 20A, the content distribution server 30A, the online store 40A, and the settlement server 50A respectively correspond to and have the same construction as the information processing terminal 10, the directory server 20, the content distribution server 30, the additional information distribution server 40, and the settlement server 50 in the digital data distribution system 1.

Figure 23:
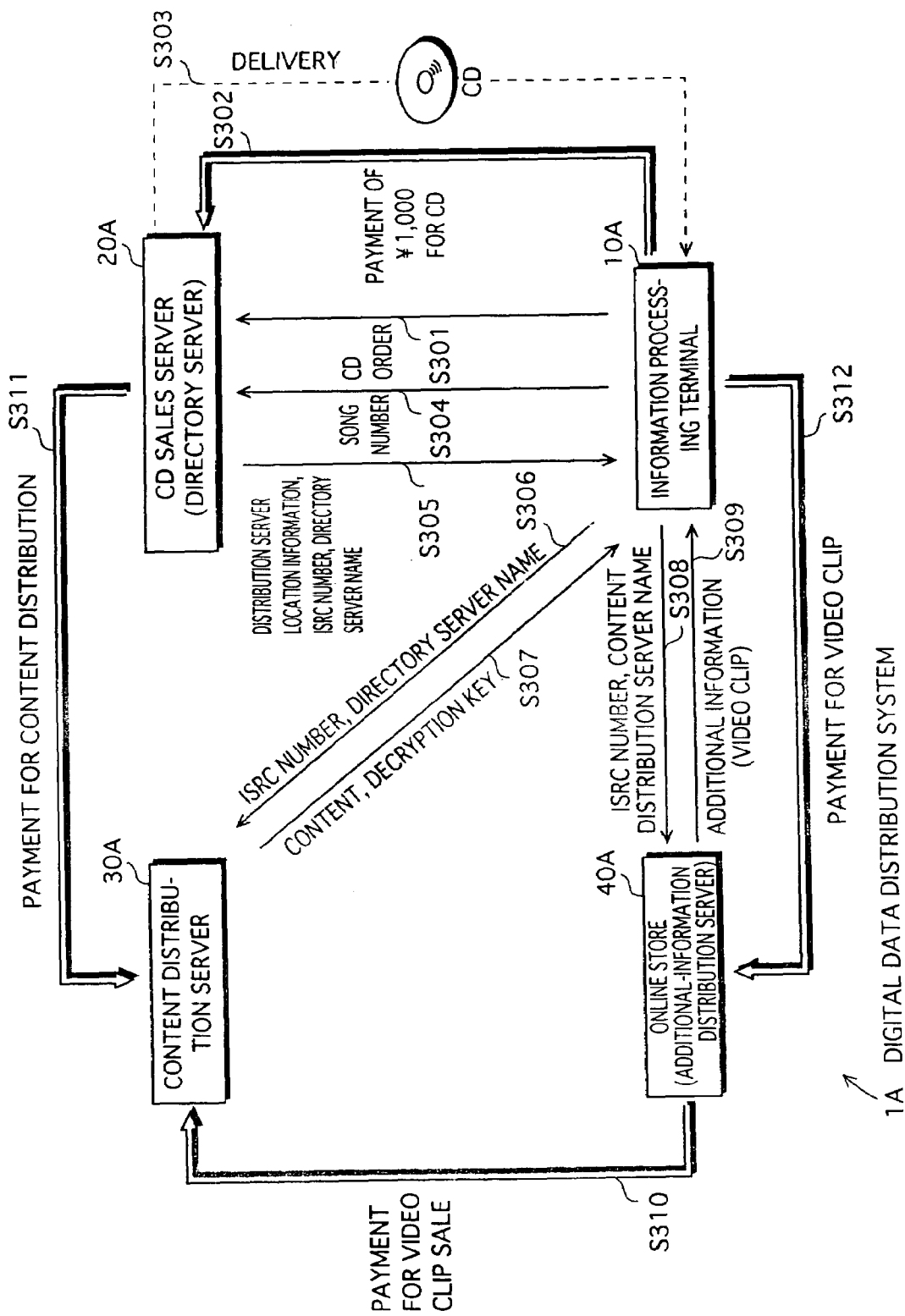
FIG. 23 is a conceptual diagram showing the overall operations of a digital data distribution system 1A.

The following describes the operations of the digital data distribution system 1A, with reference to FIG. 23.

The information processing terminal 10A transmits purchase information indicating a purchase of a CD, to the CD sales server 20A according to a user's operation, via the Internet 60 (step S301). Also, the information processing terminal 10A transmits payment information indicating a payment for the purchase, to the settlement server 50A (step S302).

The settlement server 50A receives the payment information and performs a settlement process. The settlement server 50A then transmits verification information indicating that the settlement has been completed, to the CD sales server 20A (step S302).

The CD sales server 20A receives the purchase information (step S301), receives the verification information (step S302), and then performs a delivery process of the CD. This results in the CD being delivered later to a place designated by the user (step S303).

Although the user usually receives the CD in a few days, the user can acquire music information recorded on the purchased CD before receiving the CD in the following way.

Upon completing transmission of the purchase information and the payment information, the information processing terminal 10A transmits a song number that indicates music information recorded on the CD to the CD sales server 20A via the Internet 60 according to the user's operation (step S304).

The CD sales server 20A prestores TOC information recorded on the purchased CD. Upon receipt of the song number (step S304), therefore, the CD sales server 20A acquires an ISRC number that identifies music information indicated by the received song number, distribution server location information that indicates the content distribution server 30A, a directory server name that indicates the CD sales server 20A, using the TOC information, the media ID reference table, the distribution server reference table, and the ISRC reference table, in the same manner as the directory server 20. The CD sales server 20A then transmits the acquired ISRC number, distribution server location information, and directory server name, to the information processing terminal 10A (step S305).

The information processing terminal 10A receives the ISRC number, the distribution server location information, and the directory server name (step S305), and transmits the ISRC number and the directory server name, to the content distribution server 30A identified by the received distribution server location information (step S306).

The content distribution server 30A receives the ISRC number and the directory server name (step S306), acquires content and a decryption key interrelated with the ISRC number, and transmits the acquired content and decryption key to the information processing terminal 10A (step S307).

The information processing terminal 10A receives the content and the decryption key (step S307), and reproduces the received content using the received decryption key.

Here, the content distribution server 30A issues a payment request to the CD sales server 20A for the content distribution, so that the CD sales server 20A performs the payment as requested. To be more specific, the content distribution server 30A transmits request information showing the above payment request to the settlement server 50. The settlement server 50 receives the request information. Based on the received request information, the settlement server 50 performs a settlement process for the payment to be made from the CD sales server 20A to the content distribution server 30A (step S311).

The information processing terminal 10A acquires additional-information distribution server location information that identifies the online store 40A, which corresponds to the additional-information distribution server 40 in the digital data distribution system 1, from the received content. The information processing terminal 10A then transmits the ISRC number and the content distribution server name, to the online store 40A identified by the acquired additional-information distribution server location information (step S308).

Also, the information processing terminal 10A transmits payment information showing a payment for the purchase of a video clip, to the settlement server 50A (step S312).

The settlement server 50A receives the payment information, performs a settlement process, and transmits verification information showing that the settlement has been completed, to the online store 40A (step S312).

The online store 40A receives the ISRC number and the content distribution server name (step S308), and receives the verification information (step S312). The online store 40A prestores a video clip and an ISRC number in an interrelated manner, and so acquires the video clip interrelated with the received ISRC number. The online store 40A then transmits the acquired video clip as additional information, to the information processing terminal 10A (step S309).

The information processing terminal 10A receives the video clip (step S309), and reproduces the received video clip.

Here, the online store 40A performs a payment for selling the video clip, to the content distribution server 30A. To be more specific, the online store 40A transmits payment information showing the payment, to the settlement server 50. The settlement server 50 receives the payment information. Based on the received payment-information, the settlement server 50 performs a settlement process for the payment from the online store 40A to the content distribution server 30A (step S310).

5. Conclusions

As described above, the information processing terminal reads, from a recording medium, information unique to the recording medium, receives an input from the user, displays, for the user, a processing result of each component, reads information from the recording medium, stores a terminal ID unique to the information processing terminal and terminal location information that indicates a location of the information processing terminal, transmits various information to outside, receives information from outside, stores content, reproduces the content, and read information from the content. Also, the information processing reads data from the recording medium, and converts the read data into a predetermined format.

Also, the recording medium stores content including data that is the same as the data converted by the information processing terminal.

Also, the directory server determines a content distribution server that distributes content, based on information stored in the recording medium. The directory server receives information. Also, the directory server has a database necessary for retrieving certain information. Based on the received information, the directory server accesses the database to retrieve certain information, and then transmits the retrieval result to outside.

Also, the content distribution server distributes content. The content distribution server receives information from outside. Also, the content distribution server has (a) a database necessary for retrieving certain content, (b) encrypted content to be distributed, and (c) a decryption key for decrypting the encrypted content. Based on the received information, the content distribution server accesses the database to retrieve certain content, acquires the retrieved content, transmits the acquired content to a distribution target, and stores information relating to the transmitted content in the database.

Also, the additional-information distribution server distributes additional information relating to content. The additional information distribution server receives information from outside. Also, the additional-information distribution server has (a) a database necessary for retrieving certain additional information, and (b) additional information to be distributed. Based on the received information, the additional-information distribution server accesses the database to retrieve certain additional information, acquires the retrieved additional information, transmits the acquired additional information to a distribution target, and stores information relating to the transmitted additional information in the database.

Also, the digital data distribution system is composed of some or all of the information processing terminal, the directory server, the content distribution server, and the additional-information distribution server. These components are connected with one another via a distribution network.

6. Other Modifications

Although the present invention has been described based on the above embodiment, the invention should not be limited to such. For example, the following modifications are possible.

(1) Although the above embodiment describes the case where the information processing terminal is a PC, other devices that have a similar construction and are connected to a network, such as a digital broadcast reception device, a DVD reproduction device, a set-top box, and a component system may instead be employed as the information processing terminal.

(2) The CD sales server 20A may not have a media ID reference table that is held by the directory server 20. In this case, CDs are managed by information other then media IDs. Any information that can uniquely identify each CD within the CD sales server can be used.

(3) Although the above embodiment describes the case where the components of the digital data distribution system 1 are connected with one another via the Internet 60, they may alternatively be connected via a data broadcast system, a telephone line, a cable TV system, or the like.

(4) Although the above embodiment describes the case where information acquired from CDs is TOC information, it may be other information that is unique to each CD title, such as an ID number.

(5) Although the above embodiment describes the case where a recording medium on which a music title is recorded is a CD, it may alternatively be a DVD-Audio, an MD (Mini Disc), and the like.

Also, although the present embodiment describes the case where data recorded on the recording medium of the present invention is song data, it may also be a video, a still image, an electronic magazine, or the like.

Also, although the above embodiment describes the case where the decryption key of content is acquired from the content distribution server, the decryption key may be prerecorded on a CD.

(6) Although the above embodiment describes the case where a CODEC for content provided by the content distribution server 30 is the MP3, it may alternatively be the AAC (Advanced Audio Coding), or the like.

(7) The CD sales server 20A and the content distribution server 30A are each operated by a different manager. The manager of the CD sales server 20A has a contract with managers of a plurality of content distribution servers, and enables a user who has a CD to acquire ripping content from one of the content distribution servers without requiring the user to perform CD ripping with PC software. Also, the CD sales server 20A introduces a content distribution server from which bonus-track content for the CD can be acquired, to the information processing terminal 10A.

(8) The content distribution server 30A stores an identification name identifying a CD sales server used when the user downloads content. Based on this information, the content distribution server 30A receives a payment from the CD sales server 20A. This payment may be determined according to the number of times content is downloaded, or may be set as a fixed fee per month or the like.

(9) The online store 40A is operated independently from the CD sales server 20A and the content distribution server 30A. To download and purchase additional information, the user accesses the online store 40A based on additional-information distribution server location information included in content acquired from the content distribution server 30A by the information processing terminal 10A. When the user downloads and purchases the additional information, a name of the content distribution server from which the content has been downloaded is registered into a database of the online store 40A, and a payment is made to the operator of the content distribution server according to sales or profits yielded by the downloaded content. The payment made to the operator of the content distribution server may be a fixed fee per month or the like, instead of being determined according to the sales or the profits.

(10) Although the above embodiment describes the case where the payment for the purchase is made via the settlement server, the payment may be made directly from a device that makes the payment to a device that receives the payment.

(11) The above embodiment describes the case where an instruction from the user determines whether music information is to be converted or music information is to be acquired from the content distribution device. Alternatively it may be determined by selecting a shorter time out of (a) a time taken to convert the music information and (b) a time taken to acquire the music information via the Internet 60. In this case, a time taken to acquire content from each of content distribution servers is measured and recorded in advance. Also, a time taken to convert music information using each of plural types of ripping software is measured and recorded in advance. These recorded times may be used for the above determination.

As described above, the information processing terminal 10 can acquire ripping content with the following three methods:

(A) acquire the ripping content from the recording medium on which the ripping content is recorded;

(B) acquire the ripping content from the content distribution server; and (C) acquire the ripping content by the conversion unit 105 ripping song data of the music CD.

Priority may be set in advance on each of these methods, so that the information processing terminal 10 can select one of these methods according to the priority.

Here, the user may determine the priority on each of these methods according to his or her network environment. For example, when method (C) is superior to method (B) in the speed in one user's network environment, the user may set higher priority on method (C).

The content distribution server and the additional-information distribution server may provide bonus information, or utilization points that can be acquired only via the Internet 60, to the information processing terminal 10. In this case, the user of the information processing terminal 10 may receive a certain discount when purchasing a CD next time, using the acquired utilization points.

(13) As described above, the information processing terminal in the above embodiment is capable of reading information unique to each CD, transmitting the information to the directory server, and acquiring content from the content distribution server without using CD ripping software. Also, based on information included in the content acquired from the content distribution server, additional information relating to content can be acquired by accessing the additional-information distribution server.

Also, the directory server in the above embodiment enables a Website that provides content distribution services to be retrieved, based on the received information unique to the CD.

Also, the content distribution server in the above embodiment is notified by the directory server of the information processing terminal requesting the content distribution, and distributes the requested content to the information processing terminal. The content distribution server is so enabled to manage unique information of a distribution target from which the content has been distributed, a name of the directory server via which the content has been distributed, and a name of the distributed content, with the use of a database.

Also, the additional-information distribution server in the above embodiment performs distribution of additional information requested by an accessed information processing terminal. The additional-information distribution server is so enabled to manage unique information of a distribution target from which the additional information has been distributed, a name of the content distribution server from which the content has been distributed, and a name of the distributed additional information, with the use of a database.

Also, the recording medium in the above embodiment spares the bother of ripping song data from a CD because it stores content including both normal song data and ripped song data.

The digital data distribution system that is made up of the recording medium, the information processing terminal, the directory server, the content distribution server, the additional-information distribution server described above enables the user to read information from a CD using the information processing terminal, and acquire content that is the same as content acquired by ripping, or the content that is further accompanied by additional information, from the CD or via the network, without requiring the user to perform ripping of a music track within the CD using ripping software.

The content distribution server manages a name of an accessed directory server. Therefore, an operator of the directory server can receive a payment determined by the number of accesses managed by the content distribution server.

Also, content distributed by the content distribution server to the information processing terminal may further be accompanied by information such as an access target to acquire additional information. When the user wishes to acquire the additional information from the access target, he or she can download the additional information.

The additional-information distribution server stores a distribution source from which the content whose access target is recorded is distributed in a database for managing the download purchasing. The operator of the content distribution server that is the distribution source can receive a payment determined by the number of accesses.

Also, the digital data distribution in the above embodiment enables a Website that sells CDs, to provide the same services as those provided by the directory server.

(14) The present invention also applies to the method described above. This method may be realized by computer programs that are executed by computers. Such computer programs may be distributed as digital signals.

Also, the present invention may be realized by a computer-readable recording medium, such as a flexible disk, a hard disk, a CD-ROM, an MO disc, a DVD, a DVD-ROM, a DVD-RAM, or a semiconductor memory, on which the computer programs and/or digital signals mentioned above are recorded. Conversely, the present invention may also be realized by a computer program and/or digital signal that is recorded on a recording medium.

Computer programs or digital signals that achieve the present invention may also be transmitted via a network, such as an electric communication network, a wired or wireless communication network, or the Internet.

Also, the above embodiment of the present invention can be realized by a computer system that includes a microprocessor and a memory. In this case, a computer program can be stored in the memory, with the microprocessor operating according to the computer program.

The computer programs and/or digital signals may be provided on an independent computer system by distributing a recording medium on which the computer programs and/or digital signals are recorded, or by transmitting the computer programs and/or digital signals via a network. The independent computer system may then execute the computer programs and/or digital signals to function as the present invention.

(15) The limitations described in the above embodiment and the modifications may be freely combined.

INDUSTRIAL APPLICATION

The present invention is applicable when digital-work information is acquired via a network. The present invention is particularly effective when a user who purchases a CD on which music information is recorded in a format suitable for reproduction by a playback-only device (a CD player for example) wishes to acquire music information of the same music in a format compressed and coded by a CODEC. The music information in the format compressed and coded by the CODEC can be reproduced by devices such as a PC and a PD.

The invention claimed is:

1. An information processing device for accessing a recording medium on which (a) information unique to the recording medium and (b) first information expressing a work in a first format are recorded, to acquire second information expressing the work in a second format, the information processing device comprising:

a selection unit operable to select one of a first process and a second process;

a first read unit operable to read the first information from the recording medium;

a conversion unit operable to convert the read first information from the first format to the second format, to acquire the second information;

a second read unit operable to read the unique information from the recording medium; and an online-acquisition unit operable to acquire the second information interrelated with the read unique information, from a content distribution device that stores the second information and the unique information in an interrelated manner; and a switching unit operable to cause, when the first process is selected, the first read unit and the conversion unit to perform the reading and the conversion, respectively, and to cause, when the second process is selected, the second read unit and the online-acquisition unit to perform the reading and the acquisition, respectively.

2. The information processing device of claim 1, wherein the selection unit is operable to select one of the first process and the second process according to an instruction from a user.

3. The information processing device of claim 1, wherein the selection unit is operable to select one of the first process and the second process, by referring to (a) a first time period for processing by the first process and (b) a second time period for processing by the second process.

4. The information processing device of claim 3, wherein the selection unit is operable to select the one of the first process and the second process that corresponds to a shorter one of the first time period and the second time period.

5. The information processing device of claim 4, wherein the unique information recorded on the recording medium is TOC information that includes (a) regional location information indicating a location of a region where the first information is recorded on the recording medium, and (b) a reproduction time period of the first information.

6. The information processing device of claim 1, wherein the online-acquisition unit includes:

a first acquisition unit operable to acquire, based on the read unique information, ID information identifying the second information and location information indicating a location at which the content distribution device is connected on a distribution network, from a directory distribution device connected on the distribution network; and a second acquisition unit operable to acquire the second information identified by the acquired ID information, from the content distribution device whose location is indicated by the acquired location information.

7. An information processing method for an information processing device for accessing a recording medium on which (a) information unique to the recording medium and (b) first information expressing a work in a first format are recorded, to acquire second information expressing the work in a second format, the information processing method comprising:

a selection step of selecting one of a first process and a second process; and causing, when the first process is selected:

a first read step of reading the first information from the recording medium; and a conversion step of converting the read first information from the first format to the second format, to acquire the second information, and when the second process is selected:
a second read step of reading the unique information from the recording medium; and
an online-acquisition step acquiring the second information interrelated with the read unique information, from a content distribution device that stores the second information and the unique information in an interrelated manner.

8. A computer-readable recording medium on which an information processing program is recorded for use in a computer for accessing a recording medium on which (a) information unique to the recording medium and (b) first information expressing a work in a first format are recorded, to acquire second information expressing the work in a second format, the information processing program comprising:

a selection step of selecting one of a first process and a second process; and causing, when the first process is selected:
a first read step of reading the first information from the recording medium; and
a conversion step of converting the read first information from the first format to the second format, to acquire the second information;

when the second process is selected:
a second read step of reading the unique information from the recording medium; and
an online-acquisition step of acquiring the second information interrelated with the read unique information, from a content distribution device that stores the second information and the unique information in an interrelated manner.

\* \* \* \* \*

UNITED STATES PATENT AND TRADEMARK OFFICE
CERTIFICATE OF CORRECTION

PATENT NO.      : 7,624,199 B2
APPLICATION NO. : 10/169606
DATED           : November 24, 2009
INVENTOR(S)     : Hideki Matsushima et al.

It is certified that error appears in the above-identified patent and that said Letters Patent is hereby corrected as shown below:

The title page should include a section as follows: "(63) Continuation-in-part of application No. 09/706,755, filed on November 7, 2000, now abandoned."

Column 1, lines 7-11 should read "This application is a U.S. national stage application of International application No. PCT/US01/51574 filed Nov. 7, 2001, which ~~claims priority to~~ is a continuation-in-part of U.S. application Ser. No. 09/706,755, filed Nov. 7, 2000, now abandoned."

Signed and Sealed this
Third Day of July, 2012

David J. Kappos
*Director of the United States Patent and Trademark Office*